(12) United States Patent
Landis et al.

(10) Patent No.: US 11,626,894 B2
(45) Date of Patent: Apr. 11, 2023

(54) CHANNEL AND POWER AMPLIFIER NONLINEARITY ESTIMATION

(71) Applicant: QUALCOMM Incorporated, San Diego, CA (US)

(72) Inventors: Shay Landis, Hod Hasharon (IL); Idan Michael Horn, Hod Hasharon (IL); Gideon Shlomo Kutz, Ramat Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/378,499

(22) Filed: Jul. 16, 2021

(65) Prior Publication Data
US 2023/0012494 A1    Jan. 19, 2023

(51) Int. Cl.
| | | |
|---|---|---|
| *H04B 1/04* | (2006.01) | |
| *H04B 1/12* | (2006.01) | |
| *H04W 72/044* | (2023.01) | |
| *H04L 27/38* | (2006.01) | |

(52) U.S. Cl.
CPC ............ *H04B 1/0475* (2013.01); *H04B 1/123* (2013.01); *H04L 27/38* (2013.01); *H04W 72/0473* (2013.01)

(58) Field of Classification Search
CPC ....... H04B 1/0475; H04B 1/123; H04L 27/38; H04W 72/0473
USPC ......................................... 375/262, 267, 297
See application file for complete search history.

(56) References Cited

U.S. PATENT DOCUMENTS

| | | | |
|---|---|---|---|
| 9,553,754 B1 | 1/2017 | Dorosenco et al. | |
| 2013/0034070 A1* | 2/2013 | Seo | H04L 5/0032 370/329 |
| 2019/0190552 A1 | 6/2019 | Sagi et al. | |
| 2020/0059337 A1* | 2/2020 | Yamada | H04L 27/2613 |
| 2020/0266946 A1* | 8/2020 | Kim | H04L 5/0048 |
| 2021/0367732 A1* | 11/2021 | Salim | H04W 72/0446 |
| 2022/0014397 A1* | 1/2022 | Taherzadeh Boroujeni | H04L 25/0238 |
| 2022/0141805 A1* | 5/2022 | Tooher | H04L 5/0053 370/336 |

FOREIGN PATENT DOCUMENTS

EP      3697142 A1 *  8/2020  .......... H04B 7/0617

OTHER PUBLICATIONS

International Search Report and Written Opinion—PCT/US2022/035749—ISA/EPO—dated Oct. 10, 2022.

(Continued)

*Primary Examiner* — Emmanuel Bayard
(74) *Attorney, Agent, or Firm* — Holland & Hart LLP

(57) ABSTRACT

Methods, systems, and devices for wireless communication are described. A communication device, such as a user equipment (UE) may receive a set of demodulation reference signal (DMRS) samples including a first subset of DMRS samples associated with a first power level and a second subset of DMRS samples associated with a second power level. The UE may perform a digital post distortion operation based on the first subset of DMRS samples associated with the first power level and the second subset of DMRS samples associated with the second power level. The UE may receive the wireless communication based on performing the digital post distortion operation.

30 Claims, 17 Drawing Sheets

(56) References Cited

OTHER PUBLICATIONS

Sharath M., et al., "A Two-Step Pilot Signal Approach for Distortion Compensation and Transmitter Identification in Wireless Communication Systems", 2015 International Conference and Workshop on Computing and Communication, IEEE, Oct. 15, 2015, 6 Pages, XP032823379, DOI: 10.1109/IEMCON.2015.7344454 [retrieved on Dec. 2, 2015] figures 3-4, Sections I, II-B and III.

* cited by examiner

CHANNEL AND POWER AMPLIFIER NONLINEARITY ESTIMATION

FIELD OF TECHNOLOGY

The following relates to wireless communication, including channel and power amplifier nonlinearity estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclosure relate to enabling a communication device to perform channel estimation and power amplifier non-linearity estimation for a single carrier waveform. The present disclosure provides for a joint channel estimation and power amplifier non-linearity estimation using a reference signal, for example, a demodulation reference signal (DMRS) associated with multiple power levels. To enable effective channel estimation and digital post distortion operations related to power amplifier non-linearity estimation, the communication device is configured to support a multi-level DMRS with varying signal power levels. Using the multi-level DMRS, noise due to the non-linear nature of power amplification may be efficiently interpolated and compensated for at a receiver device (e.g., post transmission) rather than at a transmitter device (e.g., prior to transmission).

The multi-level DMRS may include two or more power levels such that the communication device may estimate the channel on a first power portion (e.g., a weaker power portion) of the multi-level DMRS and subsequently use the determined channel estimation together with a second power portion (e.g., a stronger power portion) to estimate the power amplifier non-linearity for the digital post distortion operation. The proposed multi-level DMRS avoids complex and computationally costly iterative estimations. The proposed multi-level DMRS avoids erroneous estimations of the channel estimate, power amplifier non-linearities, or both, by leveraging at least two regimes of signal power providing robust environments for channel and power amplifier non-linearity estimation.

A method for wireless communication is described. The method may include receiving a set of DMRS samples including a first subset of DMRS samples associated with a first power level and a second subset of DMRS samples associated with a second power level, performing a digital post distortion operation based on the first subset of DMRS samples associated with the first power level and the second subset of DMRS samples associated with the second power level, and receiving the wireless communication based on performing the digital post distortion operation.

An apparatus for wireless communication is described. The apparatus may include a processor, memory coupled with the processor, and instructions stored in the memory. The instructions may be executable by the processor to cause the apparatus to receive a set of DMRS samples including a first subset of DMRS samples associated with a first power level and a second subset of DMRS samples associated with a second power level, perform a digital post distortion operation based on the first subset of DMRS samples associated with the first power level and the second subset of DMRS samples associated with the second power level, and receive the wireless communication based on performing the digital post distortion operation.

Another apparatus for wireless communication is described. The apparatus may include means for receiving a set of DMRS samples including a first subset of DMRS samples associated with a first power level and a second subset of DMRS samples associated with a second power level, means for performing a digital post distortion operation based on the first subset of DMRS samples associated with the first power level and the second subset of DMRS samples associated with the second power level, and means for receiving the wireless communication based on performing the digital post distortion operation.

A non-transitory computer-readable medium storing code for wireless communication is described. The code may include instructions executable by a processor to receive a set of DMRS samples including a first subset of DMRS samples associated with a first power level and a second subset of DMRS samples associated with a second power level, perform a digital post distortion operation based on the first subset of DMRS samples associated with the first power level and the second subset of DMRS samples associated with the second power level, and receive the wireless communication based on performing the digital post distortion operation.

Some examples of the method, apparatuses, and non-transitory computer-readable medium described herein may further include operations, features, means, or instructions for receiving control signaling indicating a DMRS configuration, the DMRS configuration identifying different power levels for different DMRS samples and where receiving the set of DMRS samples including the first subset of DMRS samples associated with the first power level and the second subset of DMRS samples associated with the second power level may be based on the DMRS configuration.

In some examples of the method, apparatuses, and non-transitory computer-readable medium described herein, receiving the control signaling may include operations, features, means, or instructions for receiving one or more of an RRC message, a DCI, or a MAC-CE, including the DMRS configuration identifying the different power levels for the different DMRS samples.

Some examples of the method, apparatuses, and non-transitory computer-readable medium described herein may further include operations, features, means, or instructions for receiving an indication in the control signaling a set of constellation points in a constellation distribution associated with a modulation scheme and where performing the digital post distortion operation may be based on the set of constellation points of the constellation distribution associated with the modulation scheme.

In some examples of the method, apparatuses, and non-transitory computer-readable medium described herein, the modulation scheme includes a quadrature amplitude modulation (QAM) scheme.

In some examples of the method, apparatuses, and non-transitory computer-readable medium described herein, the modulation scheme includes a quadrature phase-shift keying modulation (QPSK) scheme.

In some examples of the method, apparatuses, and non-transitory computer-readable medium described herein, the modulation scheme includes an amplitude and phase-shift keying (APSK) modulation scheme.

Some examples of the method, apparatuses, and non-transitory computer-readable medium described herein may further include operations, features, means, or instructions for estimating a channel associated with the wireless communication and a nonlinearity of a power amplifier based on the first subset of DMRS samples associated with the first power level and the second subset of DMRS samples associated with the second power level and where performing the digital post distortion operation may be based on estimating the channel associated with the wireless communication and the nonlinearity of the power amplifier.

Some examples of the method, apparatuses, and non-transitory computer-readable medium described herein may further include operations, features, means, or instructions for estimating a channel associated with the wireless communication based at least on the first subset of DMRS samples associated with the first power level and where performing the digital post distortion operation may be based on estimating the channel associated with the wireless communication.

In some examples of the method, apparatuses, and non-transitory computer-readable medium described herein, estimating the channel may include operations, features, means, or instructions for estimating the channel using a subset of constellation points of a set of constellation points associated with a modulation scheme, the subset of constellation points corresponding to inner constellation points of a constellation distribution.

Some examples of the method, apparatuses, and non-transitory computer-readable medium described herein may further include operations, features, means, or instructions for estimating a nonlinearity of a power amplifier associated with the user equipment (UE) based on the second subset of DMRS samples associated with the second power level and where performing the digital post distortion operation may be based on estimating the channel associated with the wireless communication and estimating the nonlinearity of the power amplifier associated with the UE.

In some examples of the method, apparatuses, and non-transitory computer-readable medium described herein, estimating the nonlinearity of the power amplifier may include operations, features, means, or instructions for estimating the nonlinearity of the power amplifier using a subset of constellation points of a set of constellation points associated with a modulation scheme, the subset of constellation points corresponding to outer constellation points of a constellation distribution.

In some examples of the method, apparatuses, and non-transitory computer-readable medium described herein, the wireless communication includes a single carrier waveform transmission.

A method for wireless communication at a base station is described. The method may include transmitting a set of DMRS samples including a first subset of DMRS samples associated with a first power level and a second subset of DMRS samples associated with a second power level and transmitting the wireless communication based on the set of DMRS samples.

An apparatus for wireless communication at a base station is described. The apparatus may include a processor, memory coupled with the processor, and instructions stored in the memory. The instructions may be executable by the processor to cause the apparatus to transmit a set of DMRS samples including a first subset of DMRS samples associated with a first power level and a second subset of DMRS samples associated with a second power level and transmit the wireless communication based on the set of DMRS samples.

Another apparatus for wireless communication at a base station is described. The apparatus may include means for transmitting a set of DMRS samples including a first subset of DMRS samples associated with a first power level and a second subset of DMRS samples associated with a second power level and means for transmitting the wireless communication based on the set of DMRS samples.

A non-transitory computer-readable medium storing code for wireless communication at a base station is described. The code may include instructions executable by a processor to transmit a set of DMRS samples including a first subset of DMRS samples associated with a first power level and a second subset of DMRS samples associated with a second power level and transmit the wireless communication based on the set of DMRS samples.

Some examples of the method, apparatuses, and non-transitory computer-readable medium described herein may further include operations, features, means, or instructions for transmitting control signaling indicating a DMRS configuration, the DMRS configuration identifying different power levels for different DMRS samples and where transmitting the set of DMRS samples including the first subset of DMRS samples associated with the first power level and the second subset of DMRS samples associated with the second power level may be based on the DMRS configuration.

In some examples of the method, apparatuses, and non-transitory computer-readable medium described herein, transmitting the control signaling may include operations, features, means, or instructions for transmitting one or more of an RRC message, a DCI, or a MAC-CE, including the DMRS configuration identifying the different power levels for the different DMRS samples.

Some examples of the method, apparatuses, and non-transitory computer-readable medium described herein may further include operations, features, means, or instructions for determining a set of constellation points of a constellation distribution associated with a modulation scheme and transmitting an indication in the control signaling of the set of constellation points of the constellation distribution associated with the modulation scheme.

In some examples of the method, apparatuses, and non-transitory computer-readable medium described herein, the modulation scheme includes a QAM scheme.

In some examples of the method, apparatuses, and non-transitory computer-readable medium described herein, the modulation scheme includes a QPSK scheme.

In some examples of the method, apparatuses, and non-transitory computer-readable medium described herein, the modulation scheme includes an APSK modulation scheme.

In some examples of the method, apparatuses, and non-transitory computer-readable medium described herein, the wireless communication includes a single carrier waveform transmission.

DETAILED DESCRIPTION

Figure 1:
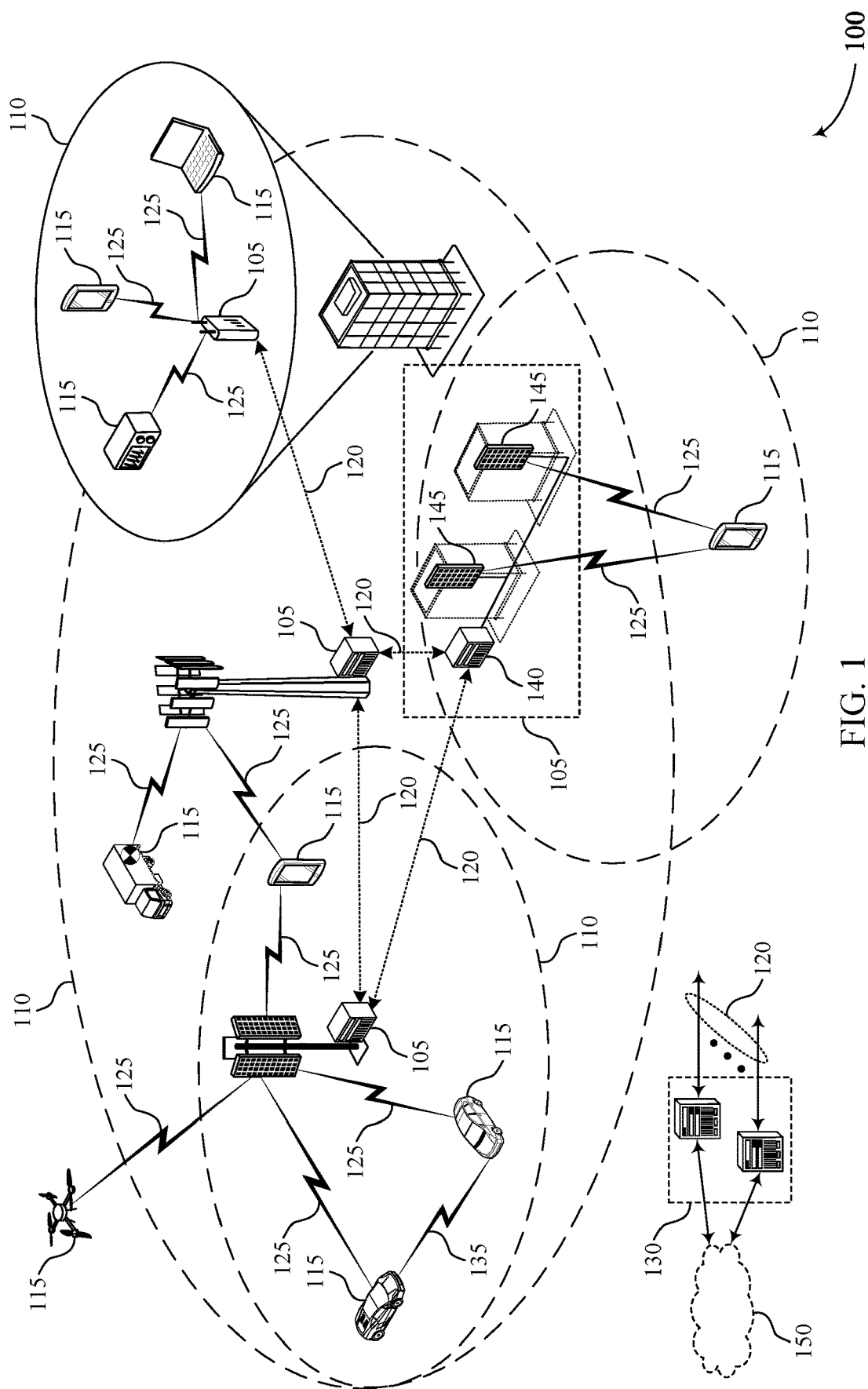
FIGS. 1 and 2 illustrate examples of wireless communications systems that support channel and power amplifier nonlinearity estimation in accordance with aspects of the present disclosure.

A wireless communications system may include a communication device, such as a UE and a base station that may support wireless communications. The communication device may perform an operation to estimate characteristics of wireless communication in the wireless communications system. In some cases, the communication device may perform channel estimation operations to interpolate, characterize, and compensate noise due to a transfer function (e.g., noise, attenuation, phase-shift) corresponding to a channel (e.g., a downlink channel, an uplink channel). A base station may transmit a reference signal on a downlink channel to a UE, which may utilize the reference signal to perform channel estimation on the downlink channel. For example, the base station may transmit a DMRS to the UE, which may use the DMRS to perform channel estimation of the downlink channel. The DMRS may correspond to a known sequence, such as Zadoff-Chu or quadrature phase shift keying (QPSK), or the like. These sequences may result in low peak-to-average power ratio (PAPR), which may benefit signaling over the downlink channel. For example, low PAPR transmissions may improve cell coverage as low PAPR enables high power transmissions without saturating a power amplifier at the transmitter device (e.g., the base station).

A high-power transmission near a power amplifier's saturation point may exhibit non-linear characteristics (e.g., noise within the downlink transmission). The non-linear nature of a power amplifier, for example, at a base station may result in an additional source of noise within a signal that may promote additional operations for filtering out the added source of noise. As such, the communication device may perform operations to estimate noise introduced by a power amplifier in addition to channel estimation. For example, a base station may perform digital pre-distortion prior to applying power amplification to a signal, where the digital pre-distortion may preemptively compensate for non-linear noise introduced by a power amplifier at the base station. The base station may also apply power amplification to a signal and subsequently transmit the signal to a UE. The UE may utilize a digital post distortion operation to compensate for non-linear noise introduced by the power amplifier at the base station after the transmission occurs. The digital post distortion may be an algorithm applied at the UE to clear non-linear noise that is generated by a known model (e.g., power amplifier clipping). Digital post distortion at the UE may allow significant power savings at the base station.

The communication device may perform digital post distortion using iterations, where hard decision slicing of a signal is done in a frequency domain at each iteration. In each iteration, the communication device receives hard decision estimates of transmitted symbols. Using the sliced symbols, a time domain signal as seen before a power amplification may be reconstructed and passed through a non-linear model. Based on the non-linear model, the communication device may estimate non-linear noise (e.g., error) which is then subtracted from the time domain signal. After estimating and removing the non-linear error from the signal, thus ending an iteration, subsequent iterations may be performed before de-mapping occurs at the communication device. In some cases, the digital post distortion using iterations may result in estimates returning erroneous results. For example, if the signal is too weak with low PAPR, then the signal may not experience power amplifier non-linearities, which may lead to incorrect estimates from the digital post distortion. Conversely, if the signal is too strong, the channel estimate may become distorted.

Various aspects of the present disclosure relate to enabling a communication device to support channel estimation and power amplifier non-linearity estimation using a multi-level DMRS. The multi-level DMRS may be associated with multiple power levels such that the communication device (e.g. a UE) may perform channel estimation using a first portion of the multi-level DMRS. For example, the multi-level DMRS may include two or more power levels such that the communication device may estimate the channel on a first power portion (e.g., a weaker power portion) of the multi-level DMRS and subsequently use the determined channel estimation together with a second power portion (e.g., a stronger power portion) to estimate the power amplifier non-linearity for the digital post distortion operation. The communication device may subsequently utilize the channel estimate gained from the first portion together with a second portion of the multi-level DMRS to estimate the power amplifier non-linearity, which may be used with the digital post distortion. The multi-level DMRS may leverage inner and outer rings of various constellation arrangements corresponding to various modulation schemes to enable joint channel estimation and power amplifier non-linearity estimation. By leveraging the multi-level DMRS, the communication device may reduce resources (e.g., computational resources) associated with iterative techniques for digital post distortion coupled with channel estimation, vastly increasing efficiency at other communication devices (e.g., a base station) while improving overall signal quality and latency within the wireless communications system.

Aspects of the disclosure are initially described in the context of wireless communications systems. Aspects of the disclosure are further illustrated by and described with reference to apparatus diagrams, system diagrams, and flowcharts that relate to channel and power amplifier nonlinearity estimation.

FIG. 1 illustrates an example of a wireless communications system 100 that supports channel and power amplifier nonlinearity estimation in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, one or more of a base station 105 or a UE 115 may perform channel estimation to interpolate and adapt to varying channel conditions that may impact wireless communication (e.g., a signal). One or more of the base station 105 or the UE 115 may perform channel estimation over one or more of a downlink channel or an uplink channel to evaluate a transmission in the presence of signal attenuation, phase-shifts, and noise, among other phenomena impacting signal quality. In some cases, the wireless communications may correspond to a single carrier waveform transmission. For example, a UE 115 may receive a wireless downlink communication (e.g., a downlink signal) from a base station 105. The UE 115 may utilize at least a portion of the wireless downlink communication (e.g., the downlink signal) to perform channel estimation of the downlink channel. The UE 115 may perform channel estimation to interpolate channel conditions to clear the wireless downlink communication (e.g., the downlink signal) of the noise.

In some cases, the wireless communication may experience non-linear noise due to power amplification. For example, a signal may become noisy due to the non-linear nature of a power amplifier. The device may perform a digital post distortion operation to estimate and clear the noise introduced to the signal by the power amplifier non-linearities. Some digital post distortion operation operations use multiple iterations to reconstruct the non-linear noise induced by the power amplifier. However, because the signal may become noisy due to both the power amplifier non-linearities and the channel noise, a UE 115 may perform a complex iterative estimation of channel noise conditions, as well as power amplifier non-linearities.

In some cases, the power of the signal may influence the effectiveness of channel estimation and digital post distortion operations. For example, if the signal is a low power signal, it is likely that the gain applied by the power amplifier was linear. That is, the location of the gain applied on the power amplifier gain band may reside in a linear region. As such, the digital post distortion operation may expect a non-linear gain profile applied to the signal, which may result in erroneous results from the digital post distortion operations. Conversely, if the signal is a high power signal (e.g., the power amplifier applied gain within the saturation region of the power amplifier gain profile), channel estimation quality may suffer due to distortion.

Various aspects of the present disclosure relate to enabling one or more of a base station 105 or a UE 115 to support channel and power amplifier nonlinearity estimation based on a multi-level DMRS. The multi-level DMRS may have two or more power levels such that one or more of the base station 105 or the UE 115 may perform channel estimation using a first power portion (e.g., weaker portion) of the multi-level DMRS. One or more of the base station 105 or the UE 115 may subsequently utilize the channel estimate gained from the relatively weaker portion together with a second power portion (e.g., stronger portion) of the multi-level DMRS to estimate the power amplifier non-linearity, which may be used with digital post distortion. In some cases, the multi-level DMRS may leverage inner and outer rings of various constellation arrangements corresponding to various modulation schemes to enable joint channel estimation and power amplifier non-linearity estimation.

For example, one or more of the base station 105 or the UE 115 may utilize an inner ring within existing 16-quadrature amplitude modulation (QAM) constellations for channel estimation. One or more of the base station 105 or the UE 115 may utilize the remaining portions (e.g., an outer ring) for power amplifier non-linearity estimation. By utilizing the multi-level DMRS together with leveraging constellation geometry to accomplish joint channel estimation and power amplifier non-linearity estimation, one or more of the base station 105 or the UE 115 may experience reduced resource usage for digital post distortion operations coupled with channel estimation. The present disclosure may increase efficiency at one or more of the base station 105 or the UE 115, while improving overall signal quality and latency within the wireless communications system 100.

Figure 2:
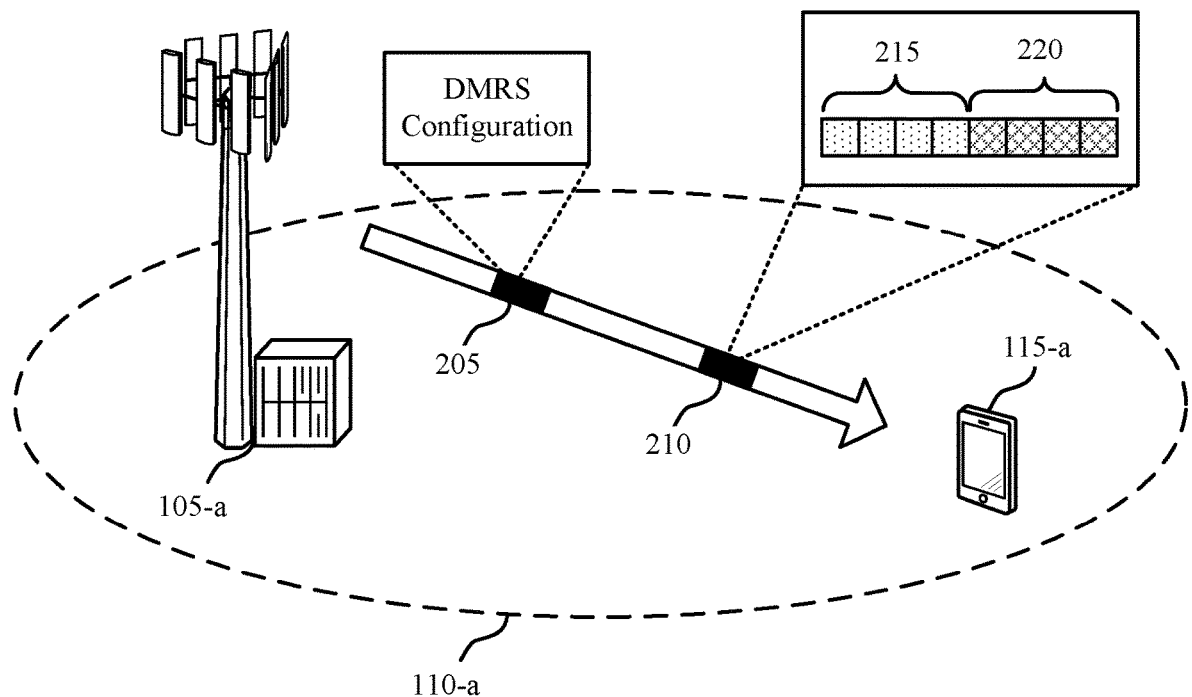

FIG. 2 illustrates an example of a wireless communications system 200 that supports channel and power amplifier nonlinearity estimation in accordance with aspects of the present disclosure. In some examples, the wireless communications system 200 may implement aspects of the wireless communications system 100 or may be implemented by aspects of the wireless communications system 100. For example, the wireless communications system 200 may include a base station 105-a and a UE 115-a, which may be examples of a base station 105 and a UE 115 as described with reference to FIG. 1. The base station 105-a may serve a geographic coverage area 110-a, which may be an example of a geographic coverage area 110 as described with reference to FIG. 1.

The base station 105-a and the UE 115-a may establish a communication link to perform one or more signaling operations. During the signaling operations, the base station 105-a and the UE 115-a may perform one or more operations to remove noise from signals. One such operation may include channel estimation to characterize sources of noise corresponding to one or more signals (e.g., due propagation through free space, scattering, fading, phase-shifting). For example, the UE 115-a may receive a reference signal from the base station 105-a. Based on the reference signal, the UE 115-a may perform one or more operations to interpolate noise within a corresponding communication and subsequently subtract the interpolated noise from the communication. The UE 115-a may also perform other operations to characterize other sources of noise in addition to channel estimation. For example, the UE 115-a may estimate introduced non-linear noise within the signal generated from power amplification at the base station 105-a. The UE 115-a may utilize a digital post distortion operation to compensate for non-linear noise introduced by a power amplifier at the base station 105-a. Digital post distortion may be applied at the UE 115-a to clear non-linear noise that is generated by a known model (e.g., power amplifier clipping).

The UE 115-a may perform digital post distortion over iterations, where hard decision slicing of a received signal is done in a frequency domain at each iteration, which may consume significant resources at the UE 115-a. For example, in each iteration, the UE 115-a computes hard decision estimates corresponding to the transmitted symbols. Using the sliced symbols, the time domain signal as seen before the power amplification is reconstructed and passed through a non-linear model. Based on the non-linear model, the UE 115-a may estimate the non-linear noise (e.g., error), which is then subtracted from the time domain signal. After estimating and removing the non-linear error from the signal, thus ending an iteration, subsequent iterations may be performed before de-mapping occurs.

During the iterations, the complexity of the digital post distortion may result in high use of computational resources (e.g., processor and memory resources) on the UE 115-a. However, by using digital post distortion vice digital pre-distortion, the base station 105-a may operate more efficiently (e.g., more efficient use of the power amplifier at the base station 105-a). In some cases, the power of the signal may influence the effectiveness of the channel estimation, the digital post distortion operation, or both. For example, a higher power signal may cause distortions in the channel, which may cause erroneous channel estimates. Conversely, a low power signal may correspond to a signal amplified within a linear region (e.g., linear portion of the power amplifier's gain profile), which may skew results from the digital post distortion operation.

In the example of FIG. 2, the UE 115-a may support using a multi-level DMRS to alleviate the impact of variable powered signals may have on estimating both the channel and the non-linearities originating from the power amplifier at the base station 105-a. In some examples, the base station 105-a may transmit a DMRS configuration 205 to the UE 115-a indicating a capability to perform a joint channel estimation and power amplifier non-linearity estimation. In some cases, the DMRS configuration 205 may correspond to a portion of a radio resource control (RRC) message, a portion of a medium access control-control element (MAC-CE), a portion of a downlink control information (DCI), or some combination thereof, where the DMRS configuration 205 indicates different power levels, a set of constellation points in a constellation distribution associated with a modulation scheme, or a combination thereof. In some examples, the DMRS configuration 205 may indicate different power levels for different DMRS signal samples.

Based on the DMRS configuration 205 received at the UE 115-a, and the UE 115-a supporting joint channel estimation and power amplifier non-linearity estimation, the base station 105-a may transmit a multi-level DMRS 210 to the UE 115-a. That is, the base station 105-a may transmit, and the UE 115-a may receive, a subset of DMRS signal samples including a first subset associated with a first power level and a second subset DMRS signal samples associated with a second power level. While the illustrated example in FIG. 2 portrays four time domain DMRS samples belonging to a low power level, and a last four time domain DMRS samples belong to a higher power level, any combination of power levels, number of samples, arrangement, or the like may be utilized to accomplish one or more aspects of the present disclosure. The multi-level DMRS 210 may have two or more portions such that the UE 115-a may perform channel estimation with a weaker portion 215. The UE 115-a may utilize the channel estimation based on the weaker portion 215 together with a strong portion 220 to estimate the power amplifier non-linearity which will be used with the digital post distortion operation. In some cases, the performance of the digital post distortion operation may be based at least in part on the set of constellation points of the constellation distribution associated with the modulation scheme.

By utilizing separate portions within the multi-level DMRS 210, previous adverse effects corresponding to signal power may be alleviated. For example, the weaker portion 215 by itself may provide for adequate channel estimation, however the weaker portion 215 may have been amplified by the power amplifier at the base station 105-a within a linear portion of the gain profile (e.g., a weaker signal may have received less gain). Thus, if just a weaker portion 215 were available, analogous to above scenarios where the signal is low in power, linear amplifier gain may skew the result of digital post distortion, which may expect non-linear characteristics within the power amplifier noise. Conversely, as another example, the stronger portion 220 by itself may provide adequate power amplifier non-linear noise estimation. However, as discussed above, a strong signal may distort channel estimation. By combining at least two DMRS portions with varying power levels (e.g., one strong and one weak) within the multi-level DMRS 210, the UE 115-a is presented with robust, viable options for efficient joint channel estimation and power amplifier non-linearity estimation. Further, the UE 115-a may utilize the channel estimation provided by the weaker portion 215, in concert with the stronger portion 220, to estimate power amplifier non-linearities.

Figure 3:
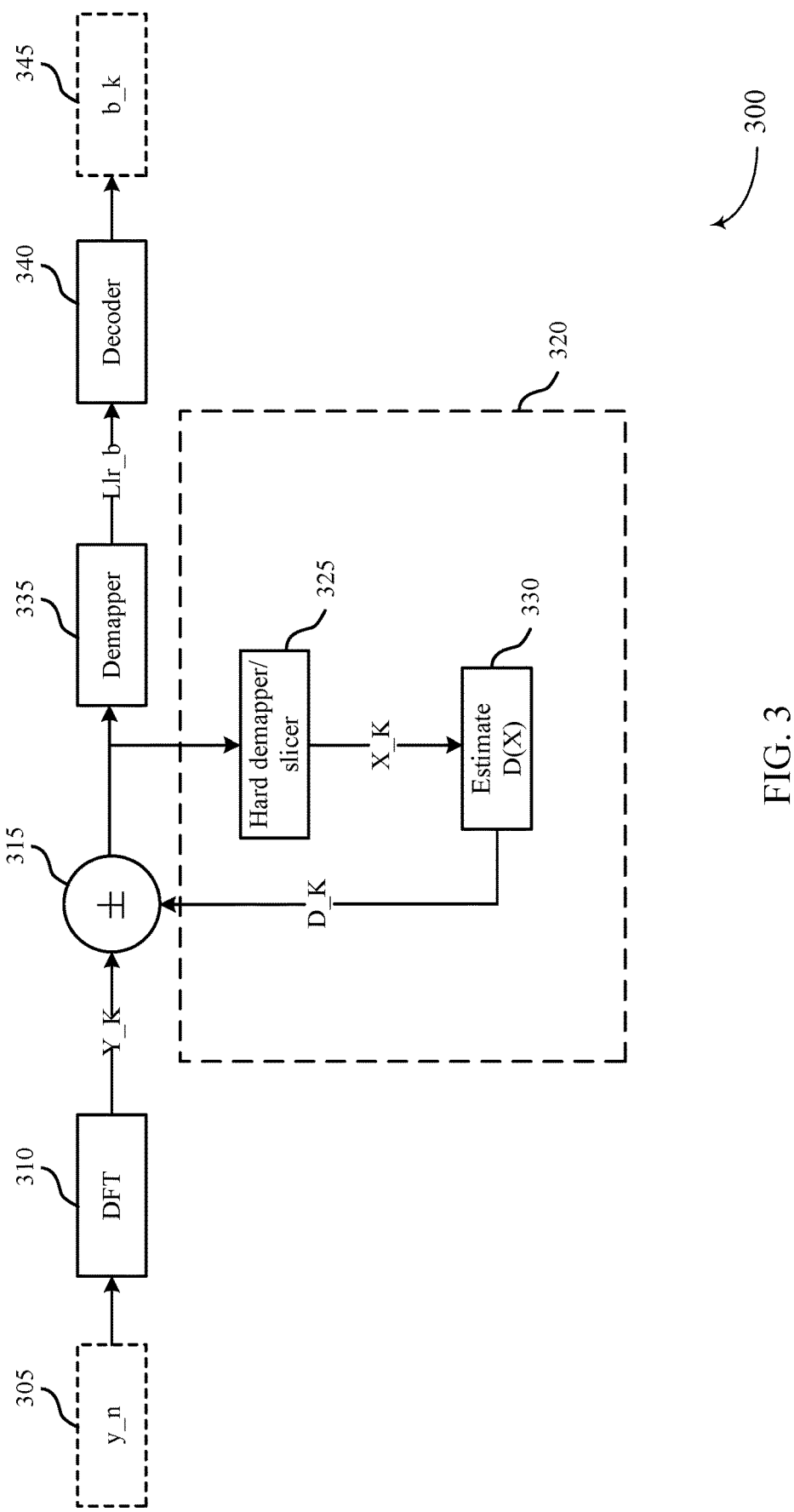
FIG. 3 illustrates an example of a digital post distortion scheme that supports channel and power amplifier nonlinearity estimation in accordance with aspects of the present disclosure.

FIG. 3 illustrates an example of a digital post distortion scheme 300 that supports channel and power amplifier nonlinearity estimation in accordance with aspects of the present disclosure. The digital post distortion scheme 300 may implement aspects of the wireless communications systems 100 and 200, or may be implemented by aspects of the wireless communications systems 100 and 200, as described with reference to FIGS. 1 and 2, respectively. The digital post distortion scheme 300 may illustrate an example of an iterative digital post distortion process that utilizes hard slicing and error estimation to iteratively remove noise generated by a power amplifier at a base station 105 from a signal received at a UE 115. For example, the UE 115 may receive a noisy signal 305 (e.g., denoted y n in FIG. 3). To prepare the noisy signal 305 for processing, the UE 115 may perform a discrete Fourier transform (DFT) 310 on the noisy signal 305. The DFT 310 of the noisy signal 305 (e.g., denoted Y_K in FIG. 3) is sent to an error correction algorithm 315 that may incorporate prior estimated errors for subtraction from Y_K.

Y_K may be fed into an iterative scheme 320 for subsequent error analysis that is then fed back into the error correction algorithm 315. The error analysis performed within the iterative scheme 320 may utilize one or more techniques to segment and estimate noise due to the non-linear nature of the power amplifier at the base station. For example, the UE 115 may utilize a hard demapper/slicer 325 to segment Y_K into a set of hard slices X_K. The hard slices X_K may then be fed into an estimator 330. Using the hard slices X_K, the estimator may go back to the time domain and simulate how an original signal may be influenced by the power amplifier at the base station. The estimator 330 may generate hard decision symbols that are used to reconstruct the transmission at the base station before going through the power amplifier non-linearity. The estimator 330 may output estimated noise levels D_K for subtraction from Y_K at the error correction algorithm 315. The estimator 330 may utilize a non-linear model including odd-order memoryless kernels such as $x \cdot |x|^2$, $x \cdot |x|^4$, etc.

In some cases (e.g., large bandwidth, high signal to noise ratio, or both) memory kernels may take the form $x[n] \cdot |x[n-k]|^M$ where k is a delay and M is an even integer. The estimator 330 may represent a complex iterative estimation. For example, the power amplifier non-linearity may be applied at the base station 105 before channel utilization. The UE 115 may receive a distorted signal within the channel, due to channel conditions and the non-linear nature of the power amplifier, among other influences. The DMRS within the signal therefore may have the channel on top of the power amplifier non-linearity, presenting a complex problem that the UE 115 may solve using iterative estimation of the channel and the power amplifier non-linearity model.

Y_K may be combined with the estimated noise levels D_K (e.g., D_K may be subtracted from Y_K) before being sent to a demapper 335. In some cases, Y_K combined with D_K may be sent back into the iterative scheme 320 for a number of iterations, which may exert a nontrivial computational burden at the UE 115. In other cases, or upon the completion of a number of iterations through the iterative scheme 320, the demapper 335 may demap and output a set of demapped symbols Llr_b for input into a decoder 340. The decoder 340 may subsequently output an estimated original signal 345 (e.g., denoted as b k in FIG. 3). The digital post distortion scheme 300 may signify a complex iterative error correction algorithm that may be influenced by the received signal's power level. If a signal is weak (e.g., relatively low power), the signal may have received gain from a linear portion of the base station 105 power amplifier gain profile. However, the digital post distortion expects non-linear characteristics in the noise from the power amplifier, which may skew outputs from the estimator 330.

Various aspects of the present disclosure provide for a multi-level DMRS to be transmitted to the UE 115, where the multi-level DMRS may present two or more portions with varying power. The UE 115 may utilize a first power portion (e.g., a weak portion) of the multi-level DMRS to perform channel estimation corresponding to a signal received from the base station. In some cases, the multi-level DMRS may be transmitted over a constellation. The weak portion of the multi-level DMRS may have relatively low amplitude, and thus reside within an inner ring of a constellation. The strong portion may have a relatively high amplitude, and thus reside on an outer ring of a constellation. It follows that the UE 115 may utilize one or more inner rings of a constellation for channel estimation and one or more outer rings of a constellation for power amplifier non-linearity estimation. The UE 115 may then utilize the channel estimate together with a second power portion (e.g., a strong portion) from the multi-level DMRS for digital post distortion operations. By utilizing the aforementioned multi-level DMRS, the digital post distortion operation no longer is an iterative scheme, thus conserving power and computational resources at the UE 115.

Figure 4:
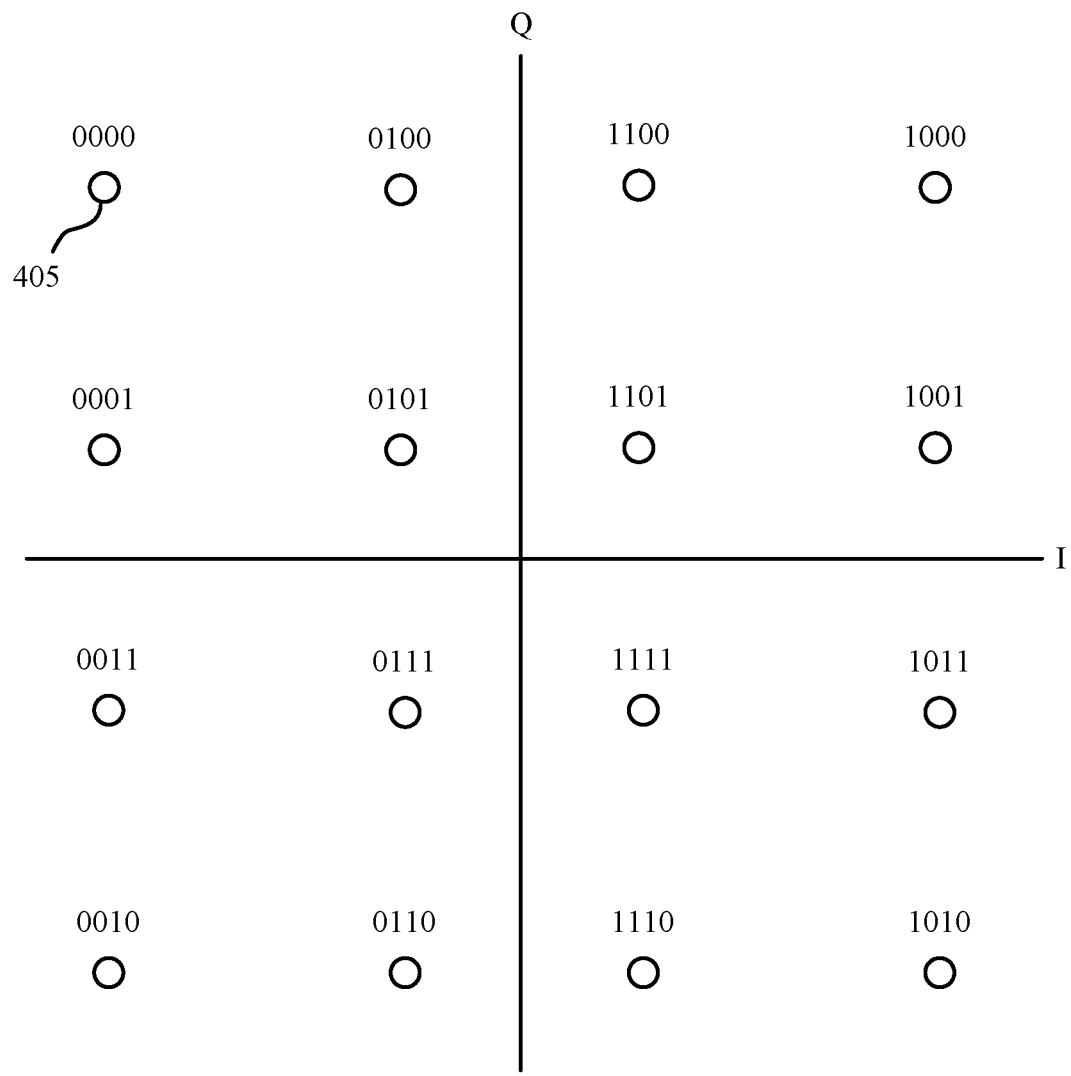
FIG. 4 illustrates an example of a constellation distribution that supports channel and power amplifier nonlinearity estimation in accordance with aspects of the present disclosure.

FIG. 4 illustrates an example of a constellation distribution 400 that supports channel and power amplifier nonlinearity estimation in accordance with aspects of the present disclosure. The constellation distribution 400 may implement aspects of the wireless communications systems 100 and 200, or may be implemented by aspects of the wireless communications systems 100 and 200, as described with reference to FIGS. 1 and 2, respectively. For example, the constellation distribution 400 may be based on a configuration by a base station 105, which may be implemented by a UE 115 to perform wireless communication with the base station 105, and provide power saving for the UE 115. While some examples of modulation schemes are discussed herein, the present disclosure may be implemented by any number of modulation and coding schemes.

One or more of the base station 105 or the UE 115 may utilize QPSK or quadrature amplitude modulation (QAM) schemes to communicate a multi-level DMRS. Constellation points within the constellation distribution 400 may be represented by adding together different amounts of a cosine wave representing the "I", or in-phase, axis, and a sine wave, shifted by 90 degrees from the "I" carrier called the "Q", or quadrature carrier, axis. The multi-level DMRS may be spatially segregated within the constellation distribution 400 such that a first power portion (e.g., a weak portion) may be read out from an inner circle corresponding to inner constellation points 405, while a second power portion (e.g., a strong portion) may be read out from an outer circle corresponding to outer constellation points 405. The weak portion may correspond to weak amplitudes (e.g., below an amplitude threshold) and the strong portion may correspond to strong amplitudes (e.g., above an amplitude threshold). As the constellation distribution 400 maps data based on phase and amplitude (e.g., the length of the line on the constellation plane), a smaller amplitude translates to a shorter distance from the origin of the constellation distribution 400.

It follows that weak amplitudes may reside on a circle with a given radius within the constellation distribution 400 (e.g., bounded by a circle, where the circle intersects the constellation points 0101, 1101, 0111, and 1111 with reference to FIG. 4). The strong amplitudes may reside on a circle with a larger radius within the constellation distribution 400 (e.g., bounded by a larger circle, where the larger circle intersects the outer constellation points, such as 0000 1000, 1010, 0010, among other outer points). Thus, the UE 115 may utilize spatial locations on the constellation distribution 400 to classify which portions of the multi-level DMRS correspond to strong and weak portions, thus enabling joint channel estimation and power amplifier non-linearity estimation. That is, 16-QAM constellations may be used for the multi-level DMRS by using the inner constellation points for channel estimation and the rest of the constellation for the power amplifier non-linearity estimation. While some examples modulation and coding schemes, such as 16-QAM, are discussed, any modulation scheme may be utilized to implement aspects of the present disclosure. For example, the techniques described may be implemented with 256-QAM, 1024-QAM, M-PSK, or any other modulation scheme.

Figure 5A:
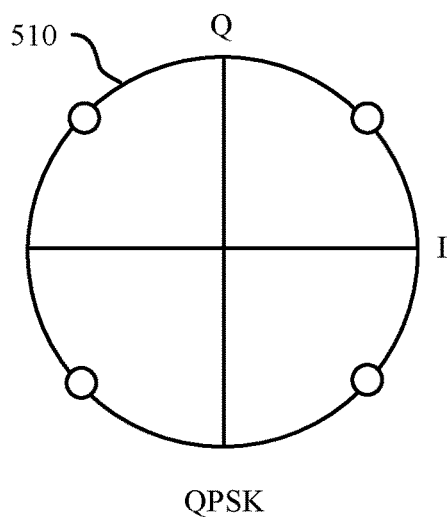
FIGS. 5A through 5D illustrate example of constellation distributions that support channel and power amplifier nonlinearity estimation in accordance with aspects of the present disclosure.

FIG. 5A illustrates an example of a constellation distribution 500-a that supports channel and power amplifier nonlinearity estimation in accordance with aspects of the present disclosure. The constellation distribution 500-a may implement aspects of the wireless communications systems 100 and 200, or may be implemented by aspects of the wireless communications systems 100 and 200, as described with reference to FIGS. 1 and 2, respectively. For example, the constellation distribution 500-a may be based on a configuration by a base station 105, which may be implemented by a UE 115 to perform wireless communication with the base station 105, and provide power saving for the UE 115. While some examples of modulation schemes are discussed herein, the present disclosure may be implemented by any number of modulation and coding schemes.

One or more of the base station 105 or the UE 115 may utilize QPSK or QAM to communicate a multi-level DMRS. Constellation points within the constellation distribution 500-a may be represented in a similar manner as FIG. 4. For example, by adding together different amounts of a cosine wave representing the "I", or in-phase, axis, and a sine wave, shifted by 90 degrees from the "I" carrier called the "Q", or quadrature carrier, axis, points within the constellation distribution 500-a may be realized. For illustrative purposes, the constellation distribution 500-a depicts QPSK, where four constellation points are illustrated lying on an outer circle 510. In this example, inner and outer rings may not be available. Without both inner and outer portions, a different scheme may be utilized to determine the channel estimate part of the multi-level DMRS and the power amplifier non-linearity part of the multi-level DMRS, where the power amplifier non-linearity part may be further analyzed by a digital post distortion algorithm. For example, depending on which quadrant a constellation point resides in along the outer circle 510 of the constellation distribution 500-a may determine what portion of the multi-level DMRS that constellation point corresponds to.

Figure 5B:
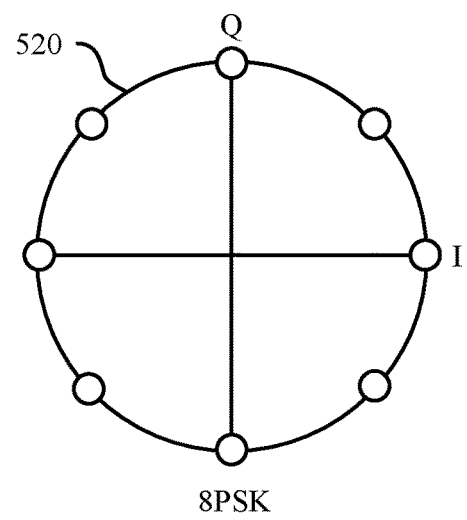

FIG. 5B illustrates an example of a constellation distribution 500-b that supports channel and power amplifier nonlinearity estimation in accordance with aspects of the present disclosure. The constellation distribution 500-b may implement aspects of the wireless communications systems 100 and 200, or may be implemented by aspects of the wireless communications systems 100 and 200, as described with reference to FIGS. 1 and 2, respectively. For example, the constellation distribution 500-b may be based on a configuration by a base station 105, which may be implemented by a UE 115 to perform wireless communication with the base station 105, and provide power saving for the UE 115. While some examples of modulation schemes are discussed herein, the present disclosure may be implemented by any number of modulation and coding schemes.

The constellation distribution 500-b may be represented on a "Q-I" plane, similar to previous examples in the present disclosure. The constellation distribution 500-b represents an 8 phase shift key (PSK) constellation grid that may provide additional constellation points on an outer ring 520. The constellation distribution 500-b, corresponding to 8-PSK, may not provide an inner ring in addition to the outer ring 520. Therefore, as with FIG. 5A, a different mapping method may be utilized to analyze the channel estimate portion and the power amplifier non-linearity portion of the multi-level DMRS, where the power amplifier non-linearity part may be further analyzed by a digital post distortion algorithm.

Figure 5C:
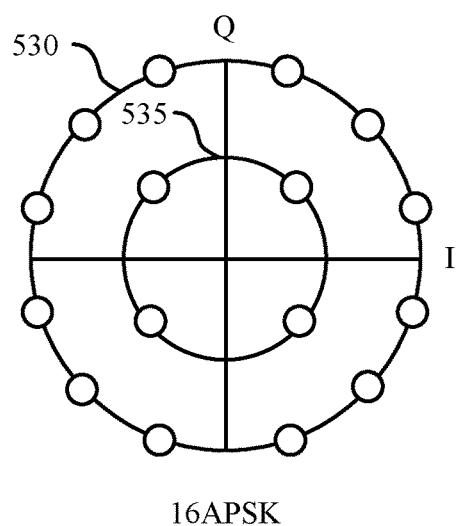

FIG. 5C illustrates an example of a constellation distribution 500-*c* that supports channel and power amplifier nonlinearity estimation in accordance with aspects of the present disclosure. The constellation distribution 500-*c* may implement aspects of the wireless communications systems 100 and 200, or may be implemented by aspects of the wireless communications systems 100 and 200, as described with reference to FIGS. 1 and 2, respectively. For example, the constellation distribution 500-*c* may be based on a configuration by a base station 105, which may be implemented by a UE 115 to perform wireless communication with the base station 105, and provide power saving for the UE 115. While some examples of modulation schemes are discussed herein, the present disclosure may be implemented by any number of modulation and coding schemes.

The constellation distribution 500-*c* may correspond to a 16 amplitude-PSK (APSK) constellation capable of accounting for phase and amplitude variations. By accounting for varying amplitudes (e.g., radius of a line from the origin), the constellation distribution 500-*c* may support one or more rings. For example, the constellation distribution 500-*c* may include an outer ring 530 and an inner ring 535. The UE 115 may utilize a spatial mapping to differentiate between the channel estimate portion of the multi-level DMRS and the power amplifier non-linearity portion of the multi-level DMRS. For example, the channel estimate portion may correspond to a first power portion (e.g., a weak power portion) of the multi-level DMRS. Weak power may result in lower amplitudes (e.g., shorter distance from the origin in the constellation distribution 500-*c*). It follows that the weaker portion of the multi-level DMRS may trace a smaller (e.g., inner) circle within the constellation distribution 500-*c*. For example, constellation points along the inner ring 535 may represent the channel estimation portion of the multi-level DMRS.

The power amplifier non-linearity portion may correspond to a second power portion (e.g., a strong signal). For example, for increased efficiency of the power amplifier at the base station, the base station may utilize a portion of the power amplifier's gain band close to saturation (e.g., higher gain). The received amplitudes corresponding to the strong portion of the multi-level DMRS may be larger as compared to the weak portion of the multi-level DMRS. It follows that stronger amplitudes from the multi-level DMRS may lie on the outer ring 530, which may correspond to the power amplifier non-linearity portion of the multi-level DMRS. By utilizing the inner ring 535 and the outer ring 530, the UE 115 may spatially classify received portions of the multi-level DMRS as corresponding to the channel estimate or the power amplifier non-linearity. As discussed above, by utilizing at least two power levels within the multi-level DMRS, the UE 115 may reliably estimate the channel and subsequently estimate the power amplifier non-linearity using the channel estimate and the strong portion of the multi-level DMRS, where the power amplifier non-linearity part may be further analyzed by a digital post distortion algorithm.

Figure 5D:
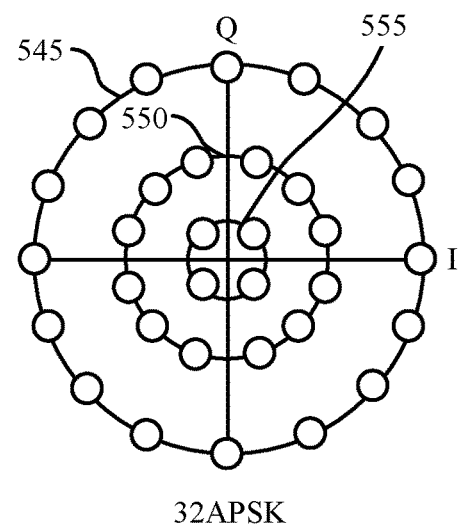

FIG. 5D illustrates an example of a constellation distribution 500-*d* that supports channel and power amplifier nonlinearity estimation in accordance with aspects of the present disclosure. The constellation distribution 500-*d* may implement aspects of the wireless communications systems 100 and 200, or may be implemented by aspects of the wireless communications systems 100 and 200, as described with reference to FIGS. 1 and 2, respectively. For example, the constellation distribution 500-*d* may be based on a configuration by a base station 105, which may be implemented by a UE 115 to perform wireless communication with the base station 105, and provide power saving for the UE 115. While some examples of modulation schemes are discussed herein, the present disclosure may be implemented by any number of modulation and coding schemes.

The constellation distribution 500-*d* may correspond to a 32-APSK constellation capable of accounting for phase and amplitude variations with greater resolution than 16-APSK. By accounting for varying amplitudes (e.g., radius of a line from the origin), the constellation distribution 500-*d* may support one or more rings. For example, the constellation distribution 500-*d* may include an outer ring 545, a middle ring 550, and an inner ring 555. The UE 115 may utilize a spatial map to differentiate between the channel estimate portion of the multi-level DMRS and the power amplifier non-linearity portion of the multi-level DMRS. For example, the channel estimate portion may correspond to a weak power portion of the multi-level DMRS. Weak power may result in lower amplitudes (e.g., shorter distance from the origin in the constellation distribution 500-*d*). It follows that the weaker portion of the multi-level DMRS may trace a smaller (e.g., inner, middle) circle within the constellation distribution 500-*d*. For example, constellation points along the inner ring 555, the middle ring 550, or both, may represent the channel estimation portion of the multi-level DMRS.

The power amplifier non-linearity portion may correspond to a strong signal. For example, for increased efficiency of the power amplifier at the base station, the base station may utilize a portion of the power amplifier's gain band close to saturation (e.g., higher gain). The received amplitudes corresponding to the strong portion of the multi-level DMRS may be larger as compared to the weak portion of the multi-level DMRS. It follows that stronger amplitudes from the multi-level DMRS may lie on the outer ring 545, which may correspond to the power amplifier non-linearity portion of the multi-level DMRS. By utilizing the inner ring 555, the middle ring 550, and the outer ring 545, the UE 115 may spatially classify received portions of the multi-level DMRS as corresponding to the channel estimate or the power amplifier non-linearity. In some examples, the multi-level DMRS may correspond to more than two power levels corresponding to more than two estimations associated with the communications between the UE 115 and the base station 105. As discussed above, by utilizing at least two power levels within the multi-level DMRS, the UE 115 may reliably estimate the channel and subsequently estimate the power amplifier non-linearity using the channel estimate and the strong portion of the multi-level DMRS, where the power amplifier non-linearity part may be further analyzed by a digital post distortion algorithm.

Figure 6:
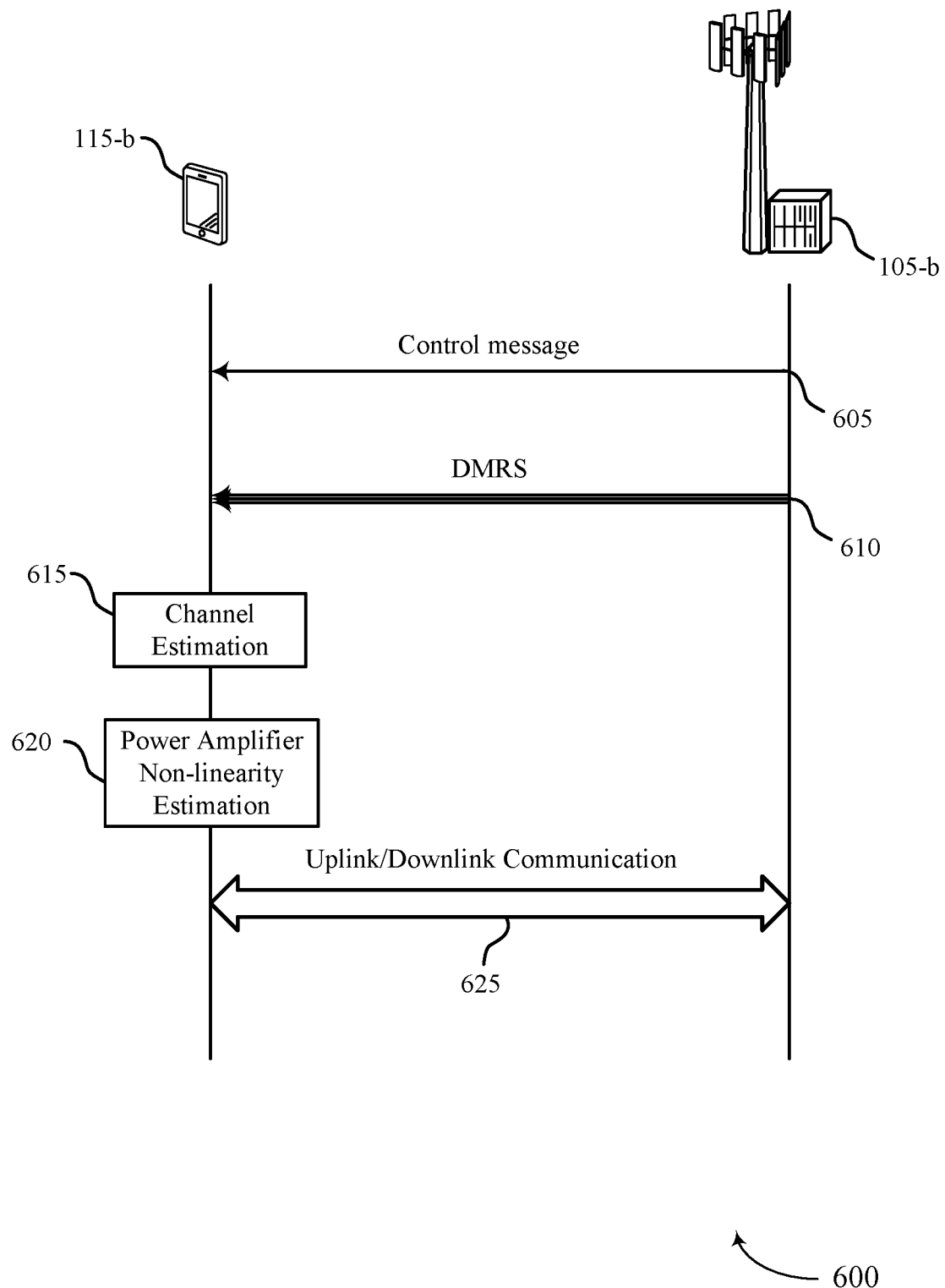
FIG. 6 illustrates an example of a process flow that supports channel and power amplifier nonlinearity estimation in accordance with aspects of the present disclosure.

FIG. 6 illustrates an example of a process flow 600 that supports channel and power amplifier nonlinearity estimation in accordance with aspects of the present disclosure. The process flow 600 may implement aspects of the wireless communications systems 100 and 200 or may be implemented by aspects of the wireless communications systems 100 and 200 as described with reference to FIGS. 1 and 2, respectively. For example, the process flow 600 may be based on a configuration by a base station 105-*b*, which may be implemented by a UE 115-*b*. In the following description of the process flow 600, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 600, and other operations may be added to the process flow 600.

At 605, the base station 105-*b* may transmit a control message to the UE 115-*b*. In some examples, the control message transmitted to the UE 115-*b* may indicate a capability to perform a joint channel estimation and power amplifier non-linearity estimation. In some cases, the control message may correspond to a portion of an RRC message, a portion of a MAC-CE (e.g., a MAC-CE field), a portion of a DCI (e.g., a DCI field), or some combination thereof. Additionally, the control message may indicate a modulation scheme, one or more constellation distributions, subsets of a DMRS with varying power levels, or some combination thereof.

At 610, the base station 105-*b* may transmit DMRS to the UE 115-*b* based on the control message at 605 and on a capability for the UE 115-*b* to support joint channel estimation and power amplifier non-linearity estimation. In some cases, the DMRS may correspond to a multi-level DMRS that may have two or more portions such that the UE 115-*b* may perform channel estimation with one portion and estimate power amplifier non-linearities with another portion. At 615, the UE 115-*b* may utilize a weak portion of the multi-level DMRS to perform channel estimation. For example, the weaker portion of the multi-level DMRS may be spatially classified using techniques discussed in FIGS. 4-5D. Based on the classified weaker portion, the UE 115-*b* may utilize the weaker portion, which may be free of channel distortion due to high power amplification gain, to perform channel estimation.

At 620, the UE 115-*b* may utilize the channel estimation performed at 615, together with a strong portion within the multi-level DMRS, to estimate the power amplifier non-linearity which may be used with the digital post distortion algorithm. As discussed above, by utilizing a strong portion, the power amplifier may apply gain to a transmission near the saturation point (non-linear portion of the gain band), thus avoiding erroneous estimates corresponding to non-linear noise induced by the power amplifier. At 625, the UE 115-*b* and the base station 105-*b* may continue single carrier waveform communications operations following noise estimation and correction based at least in part on the channel estimation at 615 and the power amplifier non-linearity estimation at 620.

Figure 7:
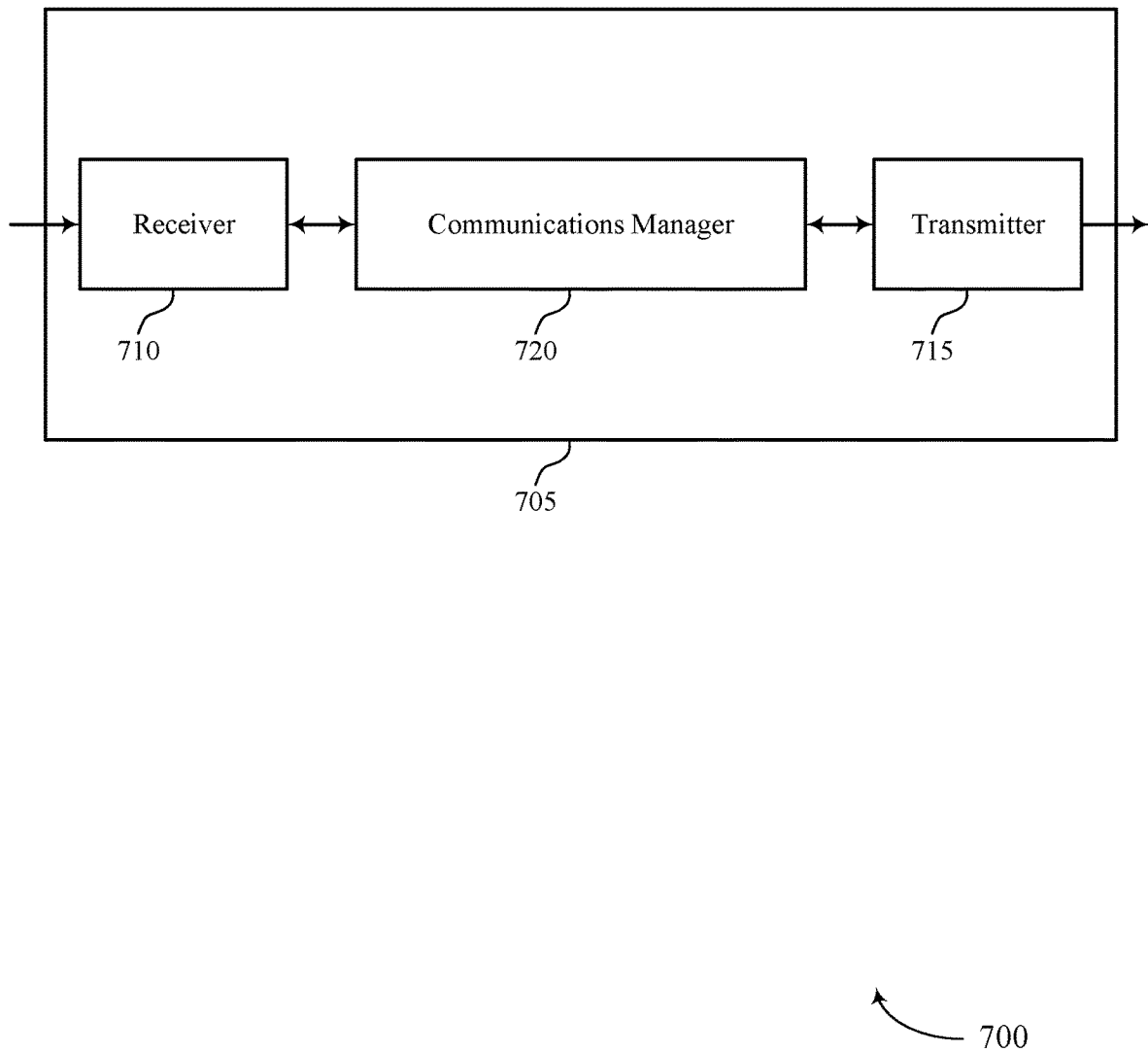
FIGS. 7 and 8 show block diagrams of devices that support channel and power amplifier nonlinearity estimation in accordance with aspects of the present disclosure.

FIG. 7 shows a block diagram 700 of a device 705 that supports channel and power amplifier nonlinearity estimation in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel and power amplifier nonlinearity estimation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel and power amplifier nonlinearity estimation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of channel and power amplifier nonlinearity estimation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication in accordance with examples as disclosed herein. For example, the communications manager 720 may be configured as or otherwise support a means for receiving a set of DMRS samples including a first subset of DMRS samples associated with a first power level and a second subset of DMRS samples associated with a second power level. The communications manager 720 may be configured as or otherwise support a means for performing a digital post distortion operation based on the first subset of DMRS samples associated with the first power level and the second subset of DMRS samples associated with the second power level. The communications manager 720 may be configured as or otherwise support a means for receiving the wireless communication based on performing the digital post distortion operation.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and reduced power consumption.

Figure 8:
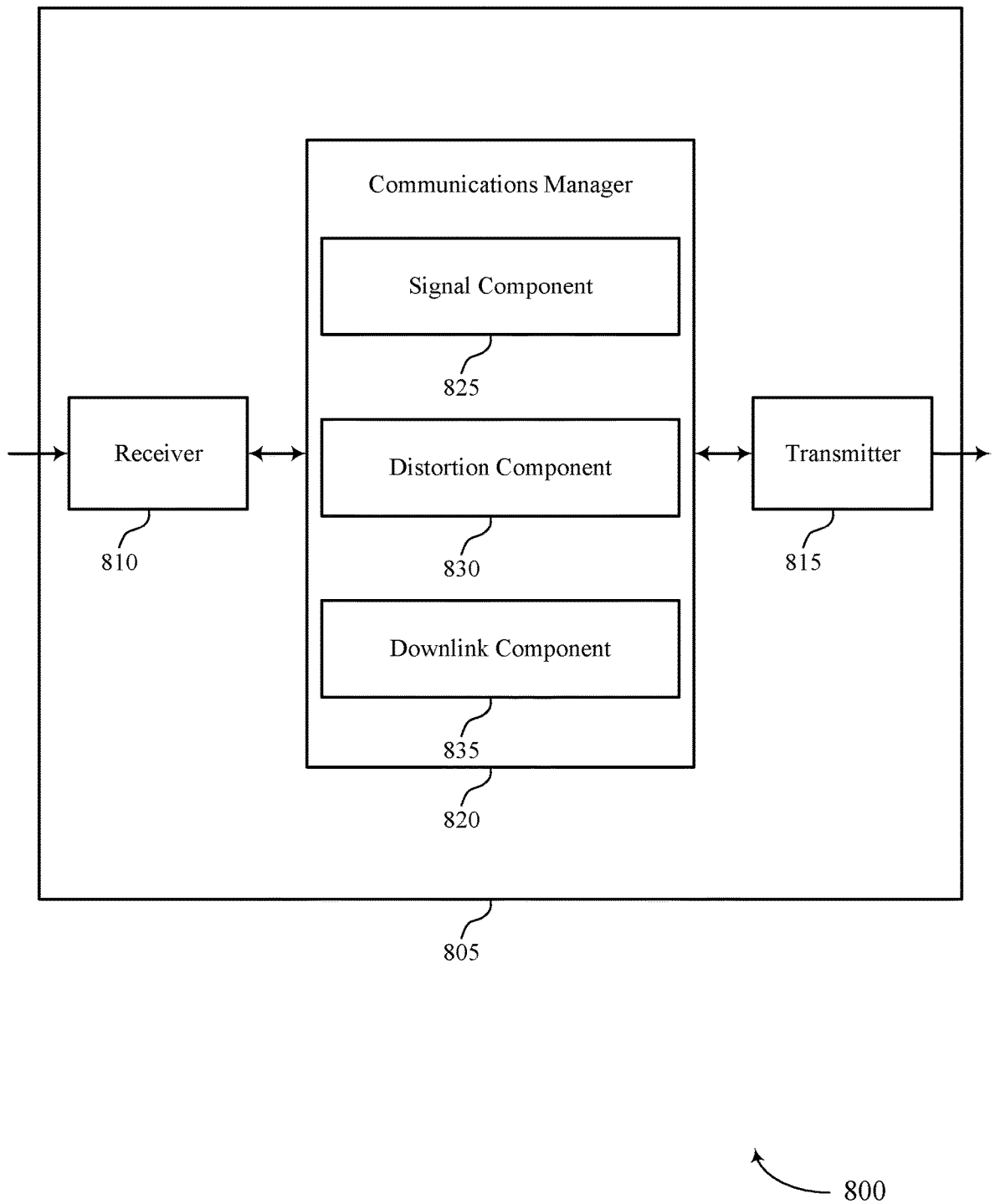

FIG. 8 shows a block diagram 800 of a device 805 that supports channel and power amplifier nonlinearity estimation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to channel and power amplifier nonlinearity estimation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to channel and power amplifier nonlinearity estimation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of channel and power amplifier nonlinearity estimation as described herein. For example, the communications manager 820 may include a signal component 825, a distortion component 830, a downlink component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication in accordance with examples as disclosed herein. The signal component 825 may be configured as or otherwise support a means for receiving a set of DMRS samples including a first subset of DMRS samples associated with a first power level and a second subset of DMRS samples associated with a second power level. The distortion component 830 may be configured as or otherwise support a means for performing a digital post distortion operation based on the first subset of DMRS samples associated with the first power level and the second subset of DMRS samples associated with the second power level. The downlink component 835 may be configured as or otherwise support a means for receiving the wireless communication based on performing the digital post distortion operation.

Figure 9:
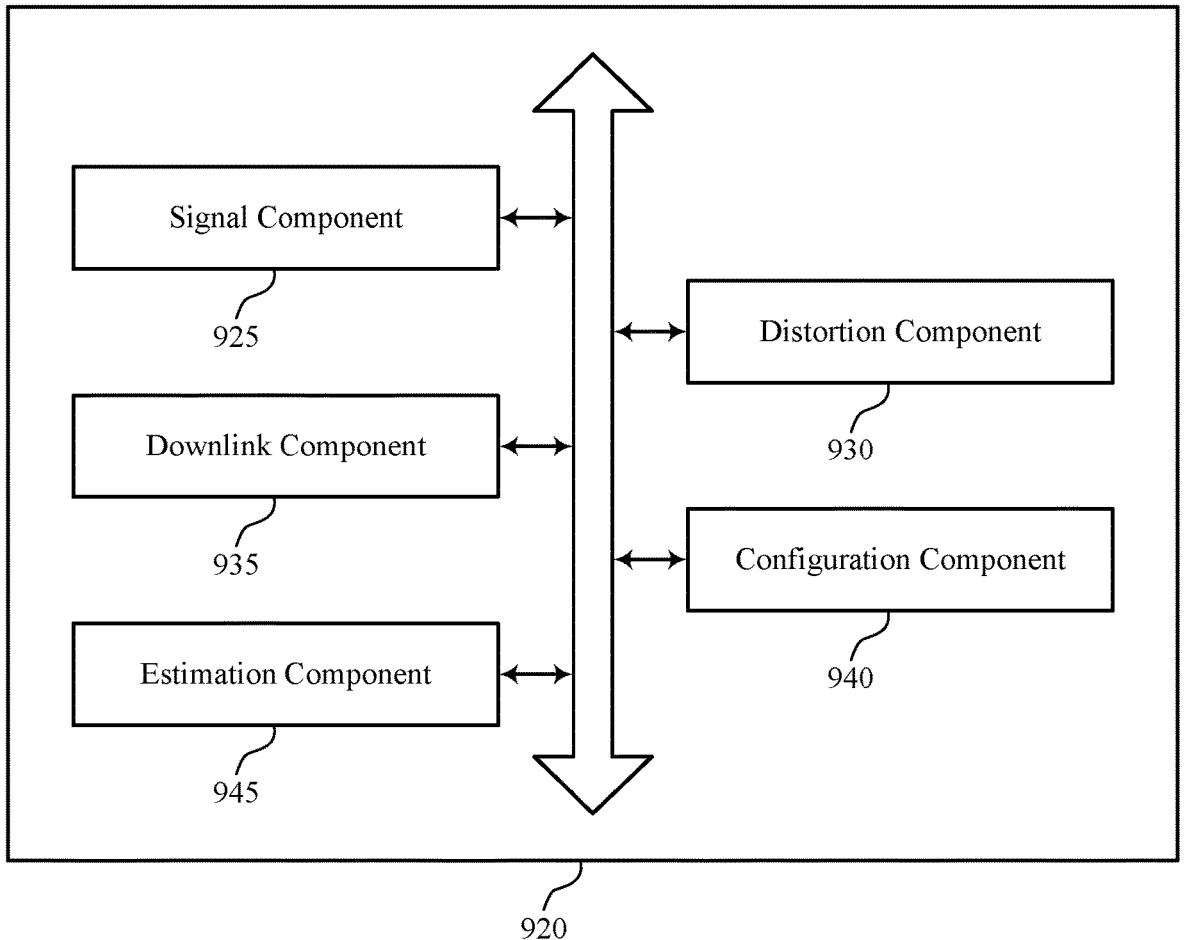
FIG. 9 shows a block diagram of a communications manager that supports channel and power amplifier nonlinearity estimation in accordance with aspects of the present disclosure.

FIG. 9 shows a block diagram 900 of a communications manager 920 that supports channel and power amplifier nonlinearity estimation in accordance with aspects of the present disclosure. The communications manager 920 may be an example of aspects of a communications manager 720, a communications manager 820, or both, as described herein. The communications manager 920, or various components thereof, may be an example of means for performing various aspects of channel and power amplifier nonlinearity estimation as described herein. For example, the communications manager 920 may include a signal component 925, a distortion component 930, a downlink component 935, a configuration component 940, an estimation component 945, or any combination thereof. Each of these components may communicate, directly or indirectly, with one another (e.g., via one or more buses).

The communications manager 920 may support wireless communication in accordance with examples as disclosed herein. The signal component 925 may be configured as or otherwise support a means for receiving a set of DMRS samples including a first subset of DMRS samples associated with a first power level and a second subset of DMRS samples associated with a second power level. The distortion component 930 may be configured as or otherwise support a means for performing a digital post distortion operation based on the first subset of DMRS samples associated with the first power level and the second subset of DMRS samples associated with the second power level. The downlink component 935 may be configured as or otherwise support a means for receiving the wireless communication based on performing the digital post distortion operation.

In some examples, the configuration component 940 may be configured as or otherwise support a means for receiving control signaling indicating a DMRS configuration, the DMRS configuration identifying different power levels for different DMRS samples. In some examples, the signal component 925 may be configured as or otherwise support a means for receiving the set of DMRS samples including the first subset of DMRS samples associated with the first power level and the second subset of DMRS samples associated with the second power level based on the DMRS configuration. In some examples, to support receiving the control signaling, the configuration component 940 may be configured as or otherwise support a means for receiving one or more of an RRC message, a DCI, or a MAC-CE, including the DMRS configuration identifying the different power levels for the different DMRS samples.

In some examples, the configuration component 940 may be configured as or otherwise support a means for receiving an indication in the control signaling a set of constellation points in a constellation distribution associated with a modulation scheme. In some examples, the distortion component 930 may be configured as or otherwise support a means for performing the digital post distortion operation based on the set of constellation points of the constellation distribution associated with the modulation scheme. In some examples, the modulation scheme includes a QAM scheme. In some examples, the modulation scheme includes a QPSK modulation scheme. In some examples, the modulation scheme includes an APSK modulation scheme.

In some examples, the estimation component 945 may be configured as or otherwise support a means for estimating a channel associated with the wireless communication and a nonlinearity of a power amplifier based on the first subset of DMRS samples associated with the first power level and the second subset of DMRS samples associated with the second power level. In some examples, the distortion component 930 may be configured as or otherwise support a means for performing the digital post distortion operation based on estimating the channel associated with the wireless communication and the nonlinearity of the power amplifier. In some examples, the estimation component 945 may be configured as or otherwise support a means for estimating a channel associated with the wireless communication based at least on the first subset of DMRS samples associated with the first power level. In some examples, the distortion component 930 may be configured as or otherwise support a means for performing the digital post distortion operation based on estimating the channel associated with the wireless communication.

In some examples, to support estimating the channel, the estimation component 945 may be configured as or otherwise support a means for estimating the channel using a subset of constellation points of a set of constellation points associated with a modulation scheme, the subset of constellation points corresponding to inner constellation points of a constellation distribution. In some examples, the estimation component 945 may be configured as or otherwise support a means for estimating a nonlinearity of a power amplifier associated with the UE based on the second subset of DMRS samples associated with the second power level. In some examples, the distortion component 930 may be configured as or otherwise support a means for performing the digital post distortion operation based on estimating the channel associated with the wireless communication and estimating the nonlinearity of the power amplifier associated with the UE.

In some examples, to support estimating the nonlinearity of the power amplifier, the estimation component 945 may be configured as or otherwise support a means for estimating the nonlinearity of the power amplifier using a subset of constellation points of a set of constellation points associated with a modulation scheme, the subset of constellation points corresponding to outer constellation points of a constellation distribution. In some examples, the wireless communication includes a single carrier waveform transmission.

Figure 10:
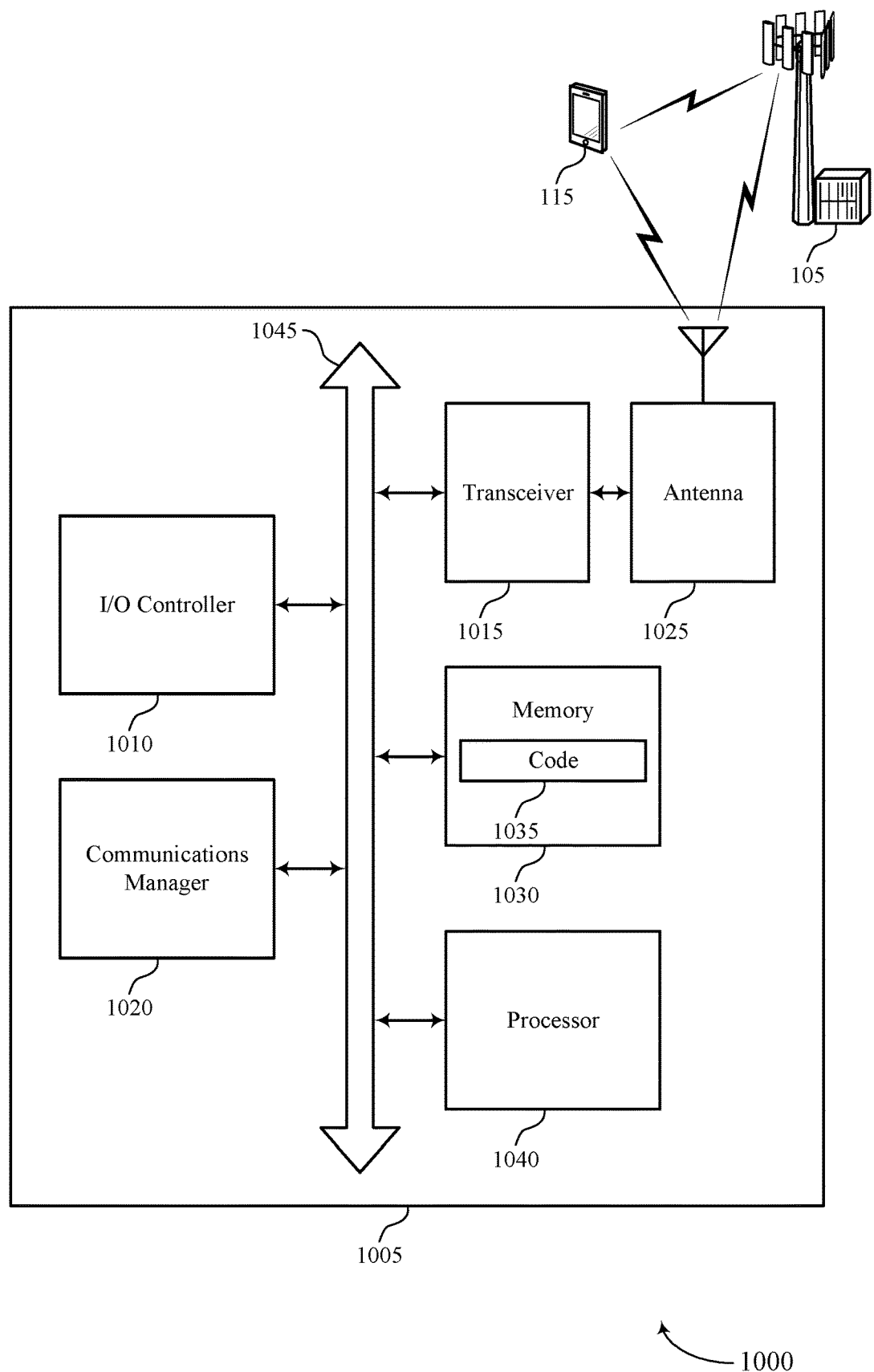
FIG. 10 shows a diagram of a system including a device that supports channel and power amplifier nonlinearity estimation in accordance with aspects of the present disclosure.

FIG. 10 shows a diagram of a system 1000 including a device 1005 that supports channel and power amplifier nonlinearity estimation in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting channel and power amplifier nonlinearity estimation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication in accordance with examples as disclosed herein. For example, the communications manager 1020 may be configured as or otherwise support a means for receiving a set of DMRS samples including a first subset of DMRS samples associated with a first power level and a second subset of DMRS samples associated with a second power level. The communications manager 1020 may be configured as or otherwise support a means for performing a digital post distortion operation based on the first subset of DMRS samples associated with the first power level and the second subset of DMRS samples associated with the second power level. The communications manager 1020 may be configured as or otherwise support a means for receiving the wireless communication based on performing the digital post distortion operation.

By including or configuring the communications manager 1020 in accordance with examples as described herein, the device 1005 may support techniques for improved user experience related to reduced processing, reduced power consumption, more efficient utilization of communication resources, and longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of channel and power amplifier nonlinearity estimation as described herein, or the processor 1040 and the memory 1030 may be otherwise configured to perform or support such operations.

Figure 11:
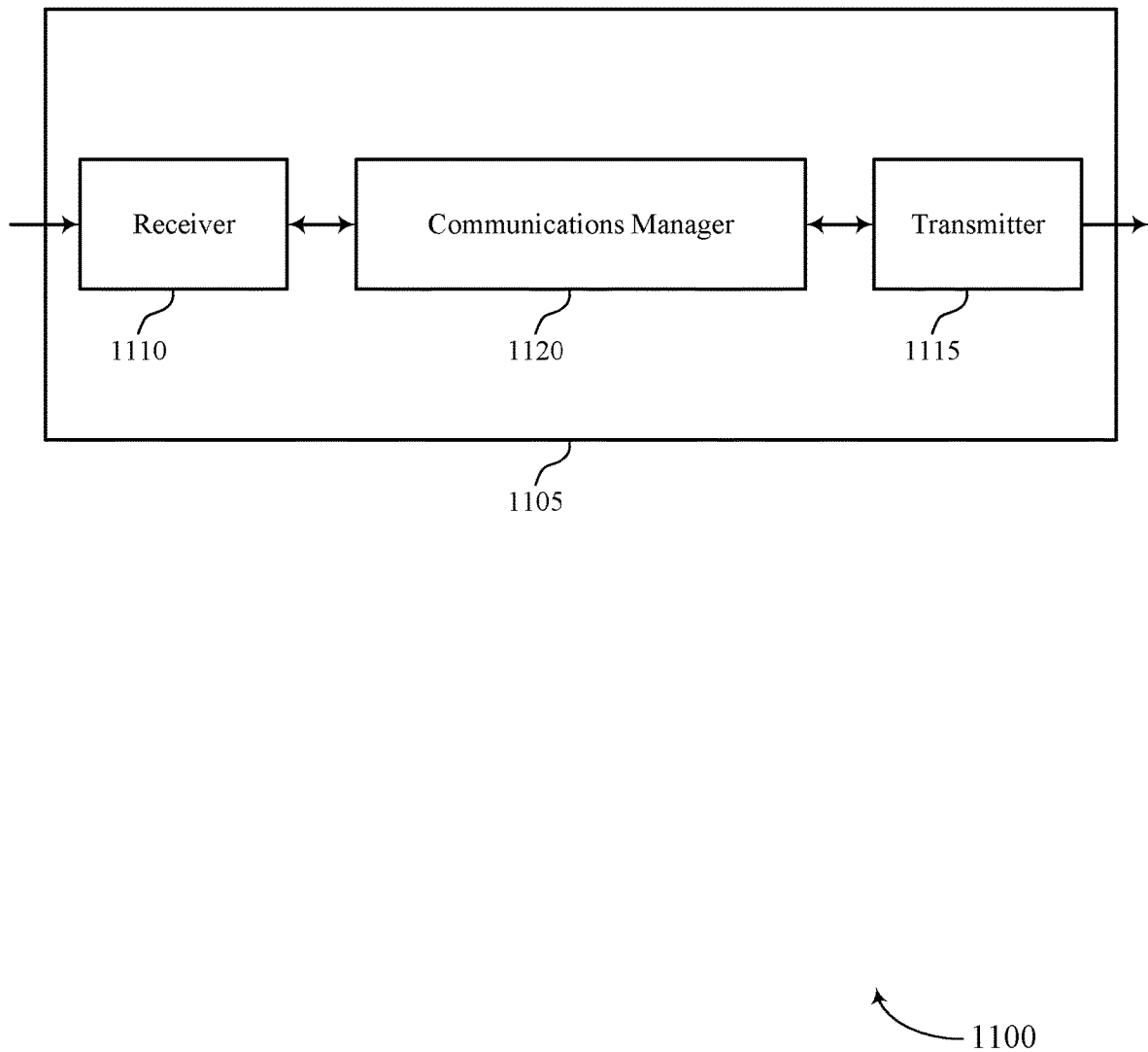
FIGS. 11 and 12 show block diagrams of devices that support channel and power amplifier nonlinearity estimation in accordance with aspects of the present disclosure.

FIG. 11 shows a block diagram 1100 of a device 1105 that supports channel and power amplifier nonlinearity estimation in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel and power amplifier nonlinearity estimation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel and power amplifier nonlinearity estimation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of channel and power amplifier nonlinearity estimation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting a set of DMRS samples including a first subset of DMRS samples associated with a first power level and a second subset of DMRS samples associated with a second power level. The communications manager 1120 may be configured as or otherwise support a means for transmitting the wireless communication based on the set of DMRS samples.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption.

Figure 12:
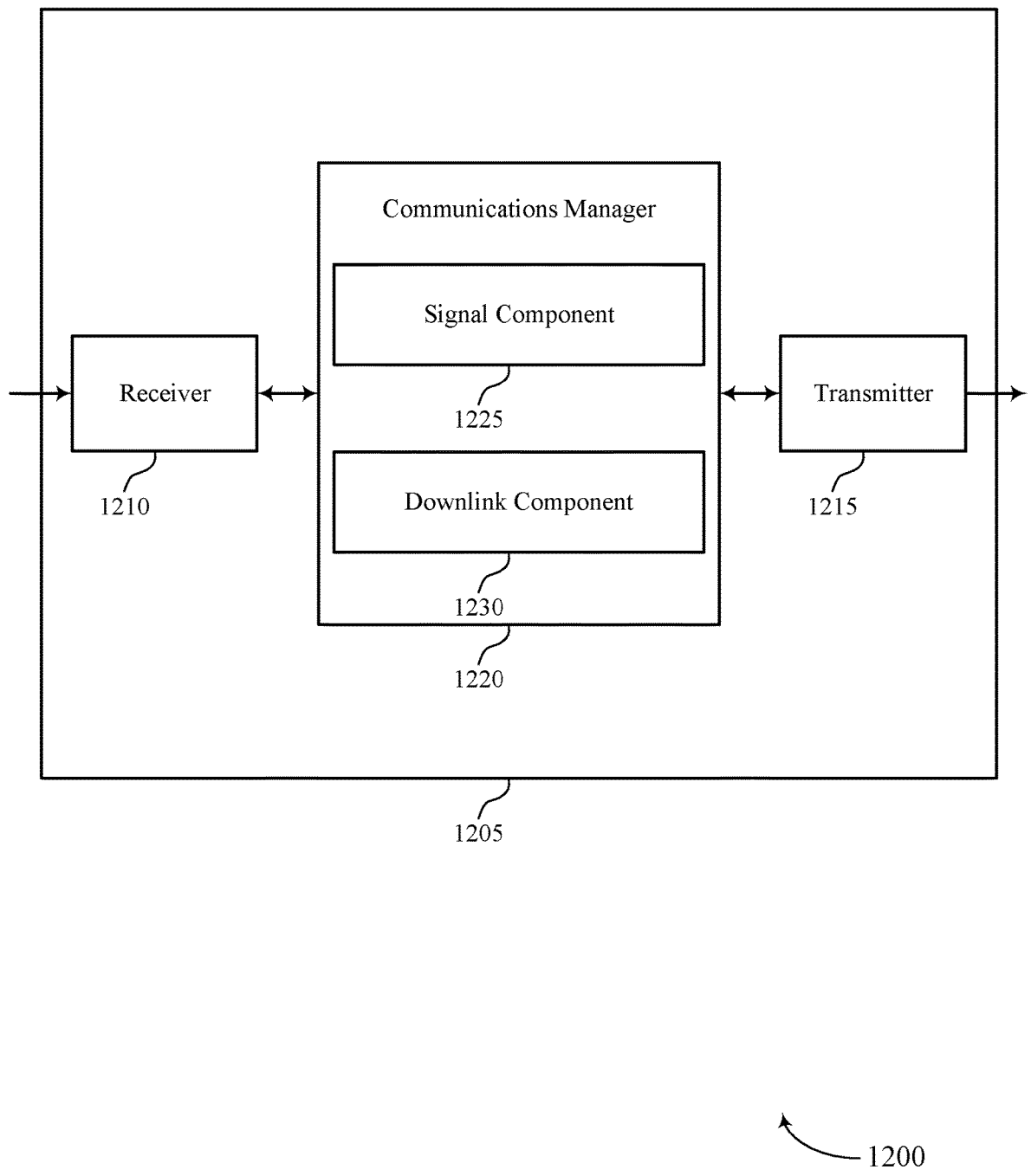

FIG. 12 shows a block diagram 1200 of a device 1205 that supports channel and power amplifier nonlinearity estimation in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to channel and power amplifier nonlinearity estimation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to channel and power amplifier nonlinearity estimation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of channel and power amplifier nonlinearity estimation as described herein. For example, the communications manager 1220 may include a signal component 1225 a downlink component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The signal component 1225 may be configured as or otherwise support a means for transmitting a set of DMRS samples including a first subset of DMRS samples associated with a first power level and a second subset of DMRS samples associated with a second power level. The downlink component 1230 may be configured as or otherwise support a means for transmitting the wireless communication based on the set of DMRS samples.

Figure 13:
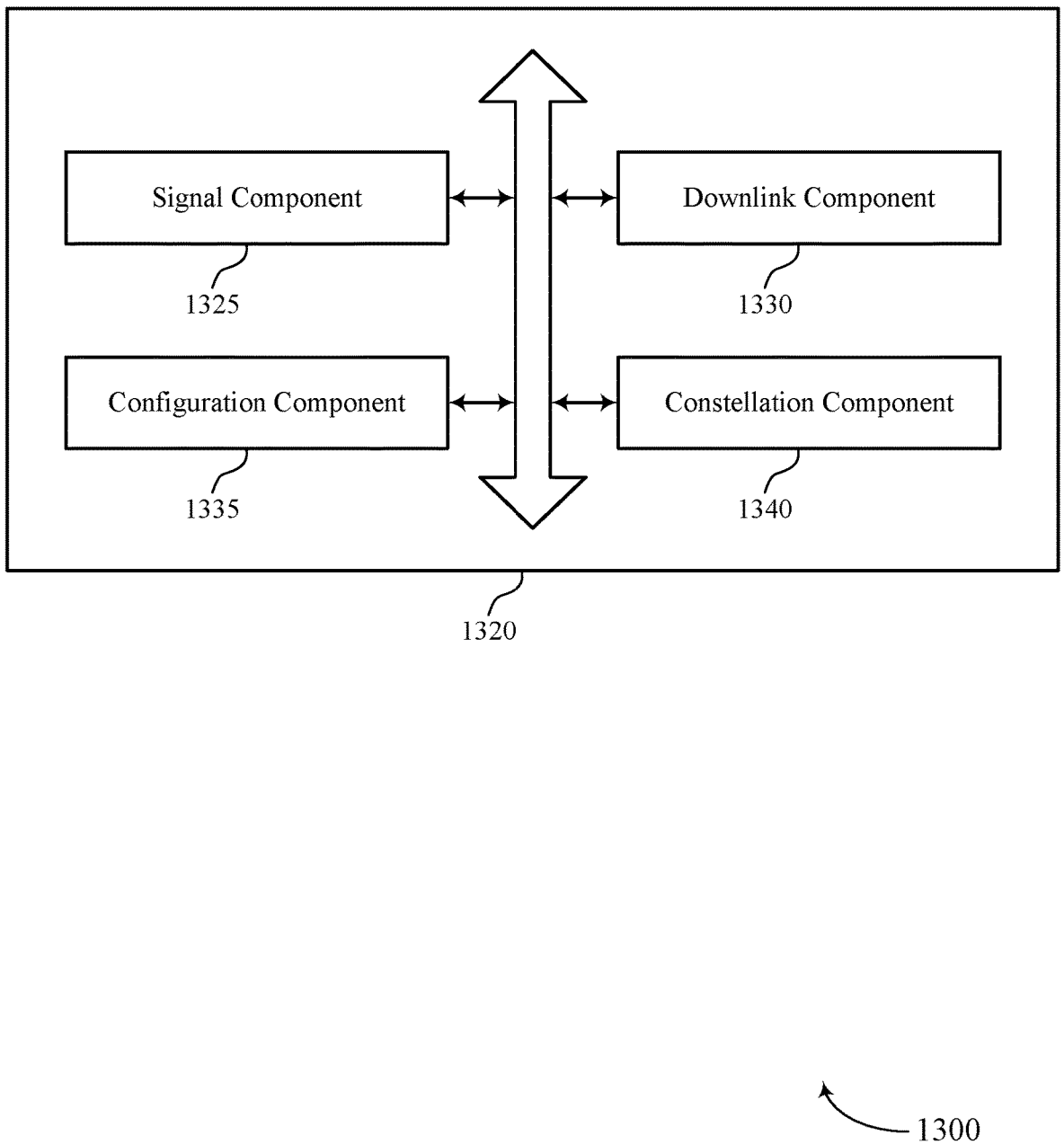
FIG. 13 shows a block diagram of a communications manager that supports channel and power amplifier nonlinearity estimation in accordance with aspects of the present disclosure.

FIG. 13 shows a block diagram 1300 of a communications manager 1320 that supports channel and power amplifier nonlinearity estimation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of channel and power amplifier nonlinearity estimation as described herein. For example, the communications manager 1320 may include a signal component 1325, a downlink component 1330, a configuration component 1335, a constellation component 1340, or any combination thereof. Each of these components may communicate, directly or indirectly, with one another (e.g., via one or more buses).

The communications manager 1320 may support wireless communication at a base station in accordance with examples as disclosed herein. The signal component 1325 may be configured as or otherwise support a means for transmitting a set of DMRS samples including a first subset of DMRS samples associated with a first power level and a second subset of DMRS samples associated with a second power level. The downlink component 1330 may be configured as or otherwise support a means for transmitting the wireless communication based on the set of DMRS samples.

In some examples, the configuration component 1335 may be configured as or otherwise support a means for transmitting control signaling indicating a DMRS configuration, the DMRS configuration identifying different power levels for different DMRS samples. In some examples, the downlink component 1330 may be configured as or otherwise support a means for where transmitting the set of DMRS samples including the first subset of DMRS samples associated with the first power level and the second subset of DMRS samples associated with the second power level is based on the DMRS configuration. In some examples, to support transmitting the control signaling, the configuration component 1335 may be configured as or otherwise support a means for transmitting one or more of an RRC message, a DCI, or a MAC-CE, including the DMRS configuration identifying the different power levels for the different DMRS samples.

In some examples, the constellation component 1340 may be configured as or otherwise support a means for determining a set of constellation points of a constellation distribution associated with a modulation scheme. In some examples, the configuration component 1335 may be configured as or otherwise support a means for transmitting an indication in the control signaling of the set of constellation points of the constellation distribution associated with the modulation scheme. In some examples, the modulation scheme includes a QAM scheme. In some examples, the modulation scheme includes a QPSK modulation scheme. In some examples, the modulation scheme includes an APSK modulation scheme. In some examples, the wireless communication includes a single carrier waveform transmission.

Figure 14:
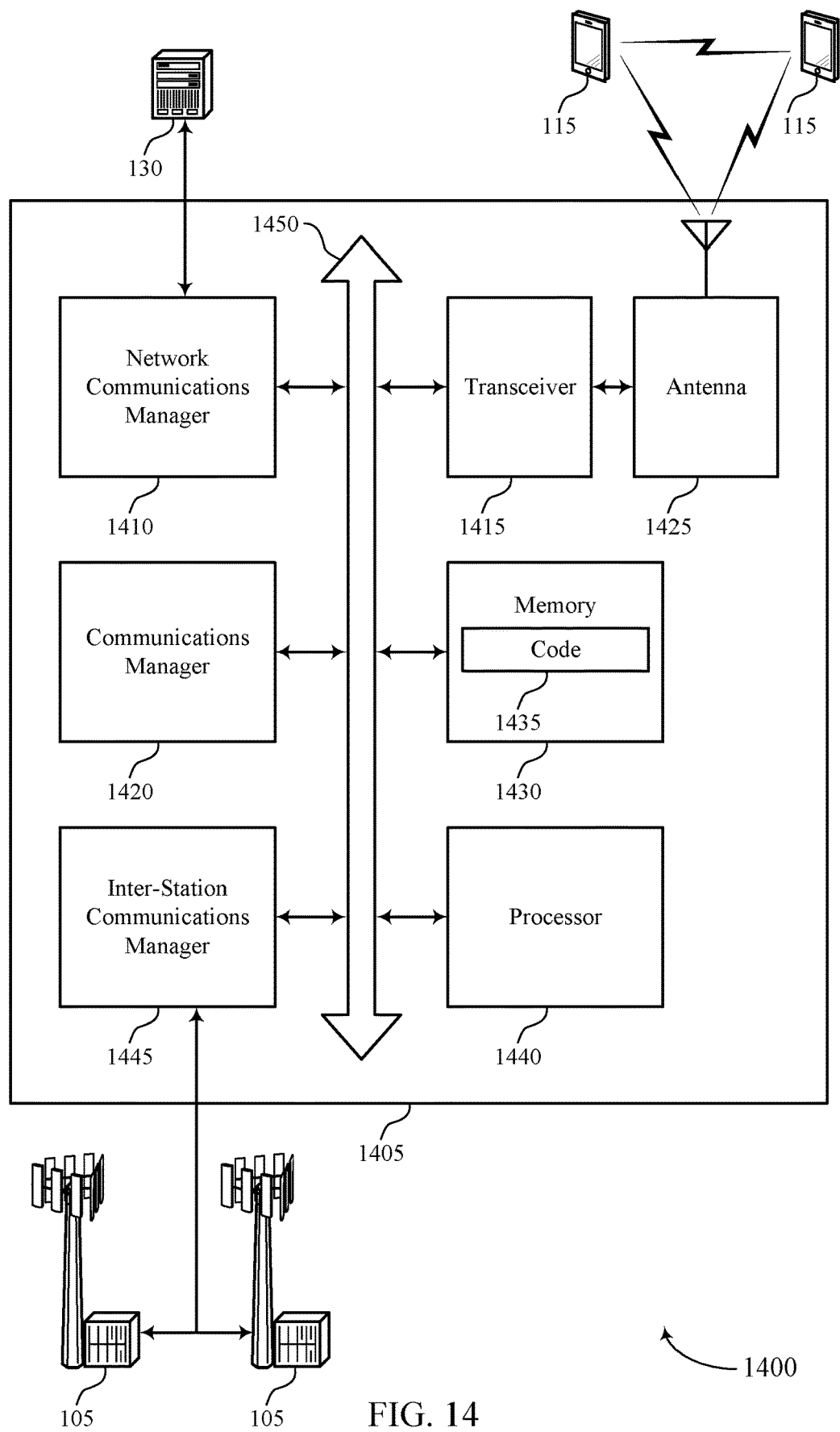
FIG. 14 shows a diagram of a system including a device that supports channel and power amplifier nonlinearity estimation in accordance with aspects of the present disclosure.

FIG. 14 shows a diagram of a system 1400 including a device 1405 that supports channel and power amplifier nonlinearity estimation in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting channel and power amplifier nonlinearity estimation). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting a set of DMRS samples including a first subset of DMRS samples associated with a first power level and a second subset of DMRS samples associated with a second power level. The communications manager 1420 may be configured as or otherwise support a means for transmitting the wireless communication based on the set of DMRS samples.

By including or configuring the communications manager 1420 in accordance with examples as described herein, the device 1405 may support techniques for improved communication reliability, reduced latency, and reduced power consumption.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of channel and power amplifier nonlinearity estimation as described herein, or the processor 1440 and the memory 1430 may be otherwise configured to perform or support such operations.

Figure 15:
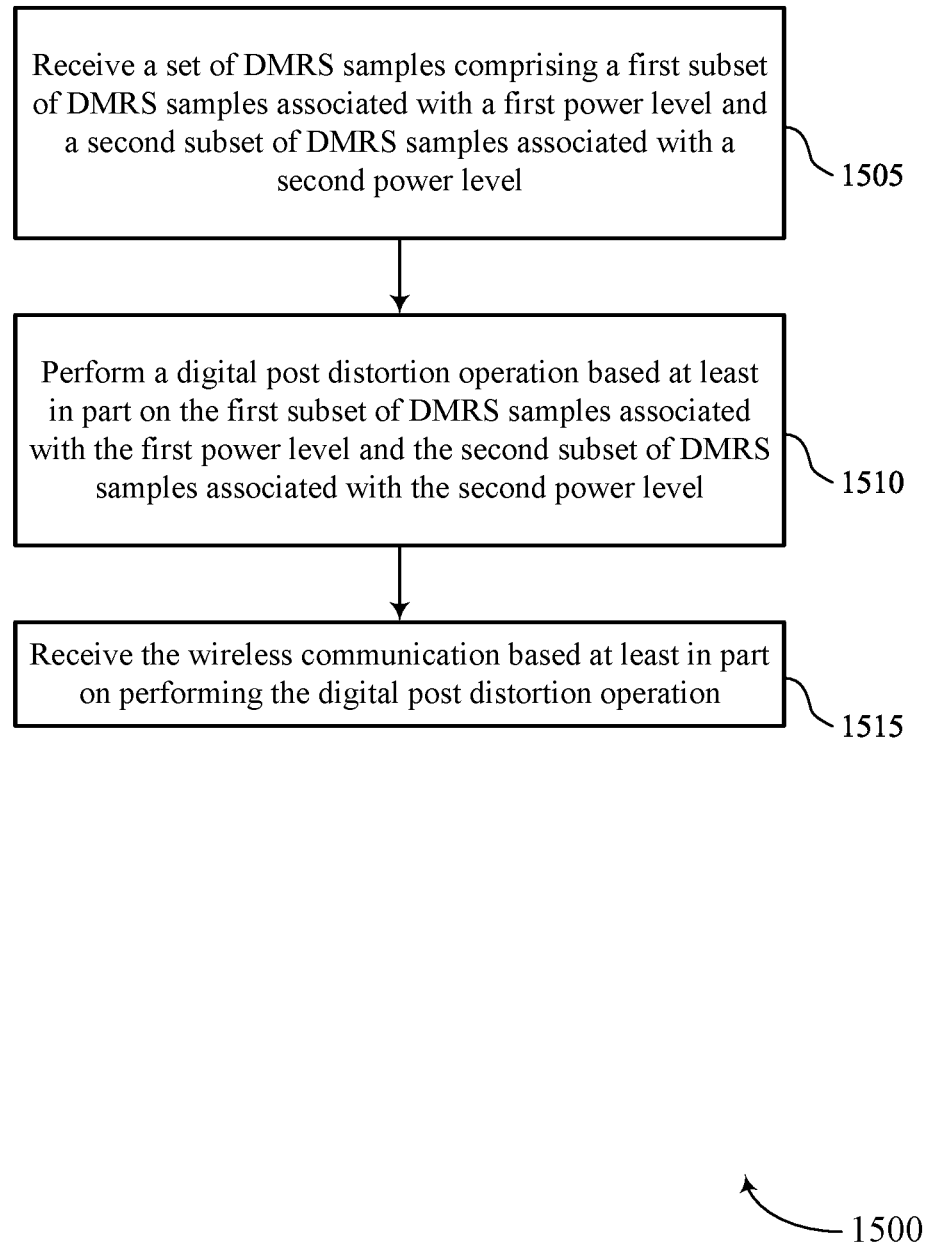
FIGS. 15 through 17 show flowcharts illustrating methods that support channel and power amplifier nonlinearity estimation in accordance with aspects of the present disclosure.

FIG. 15 shows a flowchart illustrating a method 1500 that supports channel and power amplifier nonlinearity estimation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a set of DMRS samples including a first subset of DMRS samples associated with a first power level and a second subset of DMRS samples associated with a second power level. The operations of 1505 may be performed in accordance with examples as disclosed herein. In some examples, aspects of the operations of 1505 may be performed by a signal component 925 as described with reference to FIG. 9.

At 1510, the method may include performing a digital post distortion operation based on the first subset of DMRS samples associated with the first power level and the second subset of DMRS samples associated with the second power level. The operations of 1510 may be performed in accordance with examples as disclosed herein. In some examples, aspects of the operations of 1510 may be performed by a distortion component 930 as described with reference to FIG. 9.

At 1515, the method may include receiving the wireless communication based on performing the digital post distortion operation. The operations of 1515 may be performed in accordance with examples as disclosed herein. In some examples, aspects of the operations of 1515 may be performed by a downlink component 935 as described with reference to FIG. 9.

Figure 16:
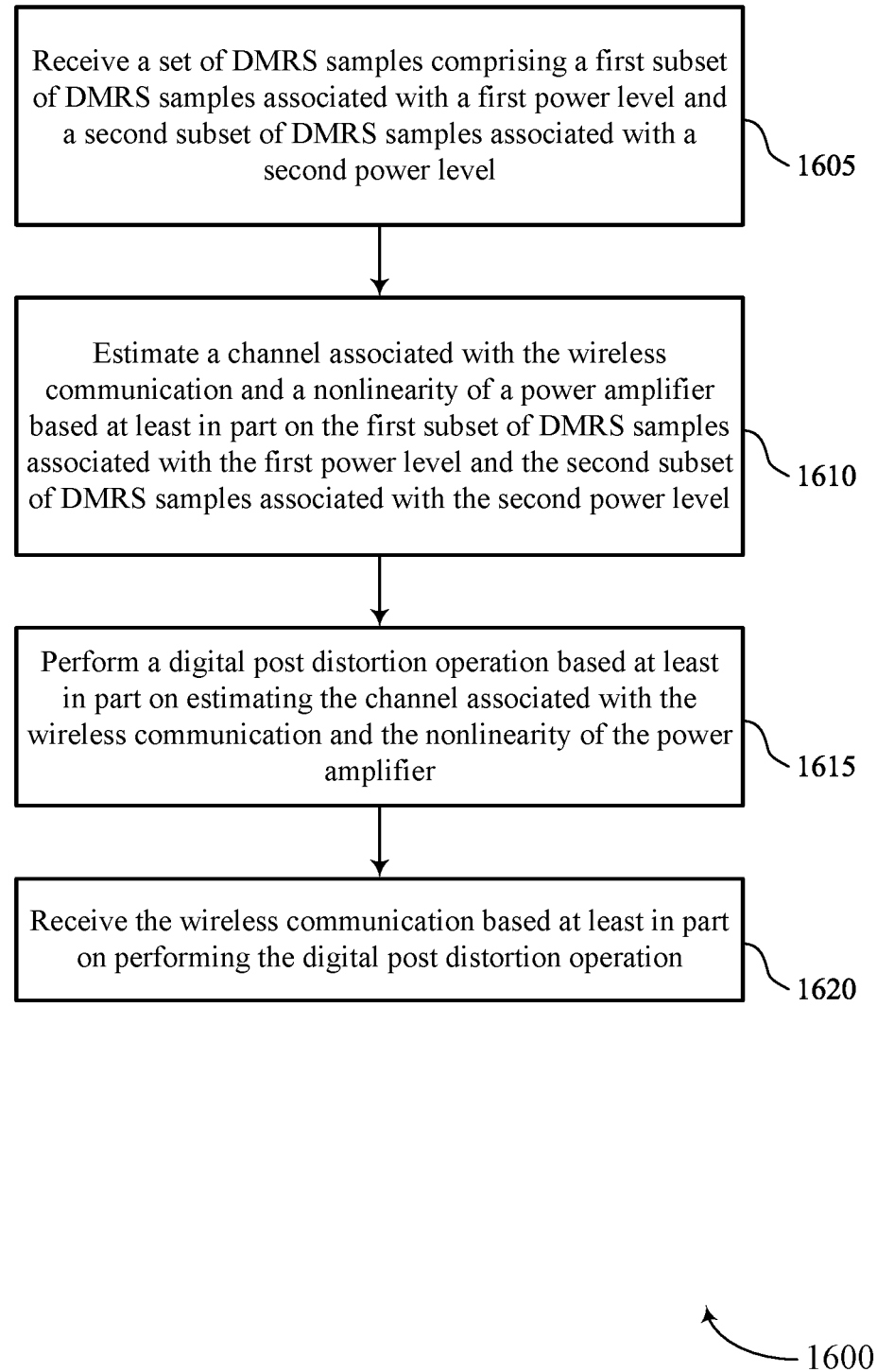

FIG. 16 shows a flowchart illustrating a method 1600 that supports channel and power amplifier nonlinearity estimation in accordance with aspects of the present disclosure. The operations of the method 1600 may be implemented by a UE or its components as described herein. For example, the operations of the method 1600 may be performed by a UE 115 as described with reference to FIGS. 1 through 10.

In some examples, a UE may execute a set of instructions to control the functional elements of the UE to perform the described functions. Additionally or alternatively, the UE may perform aspects of the described functions using special-purpose hardware.

At 1605, the method may include receiving a set of DMRS samples including a first subset of DMRS samples associated with a first power level and a second subset of DMRS samples associated with a second power level. The operations of 1605 may be performed in accordance with examples as disclosed herein. In some examples, aspects of the operations of 1605 may be performed by a signal component 925 as described with reference to FIG. 9.

At 1610, the method may include estimating a channel associated with the wireless communication and a nonlinearity of a power amplifier based on the first subset of DMRS samples associated with the first power level and the second subset of DMRS samples associated with the second power level. The operations of 1610 may be performed in accordance with examples as disclosed herein. In some examples, aspects of the operations of 1610 may be performed by an estimation component 945 as described with reference to FIG. 9.

At 1615, the method may include performing a digital post distortion operation based on estimating the channel associated with the wireless communication and the nonlinearity of the power amplifier. The operations of 1615 may be performed in accordance with examples as disclosed herein. In some examples, aspects of the operations of 1615 may be performed by a distortion component 930 as described with reference to FIG. 9.

At 1620, the method may include receiving the wireless communication based on performing the digital post distortion operation. The operations of 1620 may be performed in accordance with examples as disclosed herein. In some examples, aspects of the operations of 1620 may be performed by a downlink component 935 as described with reference to FIG. 9.

Figure 17:
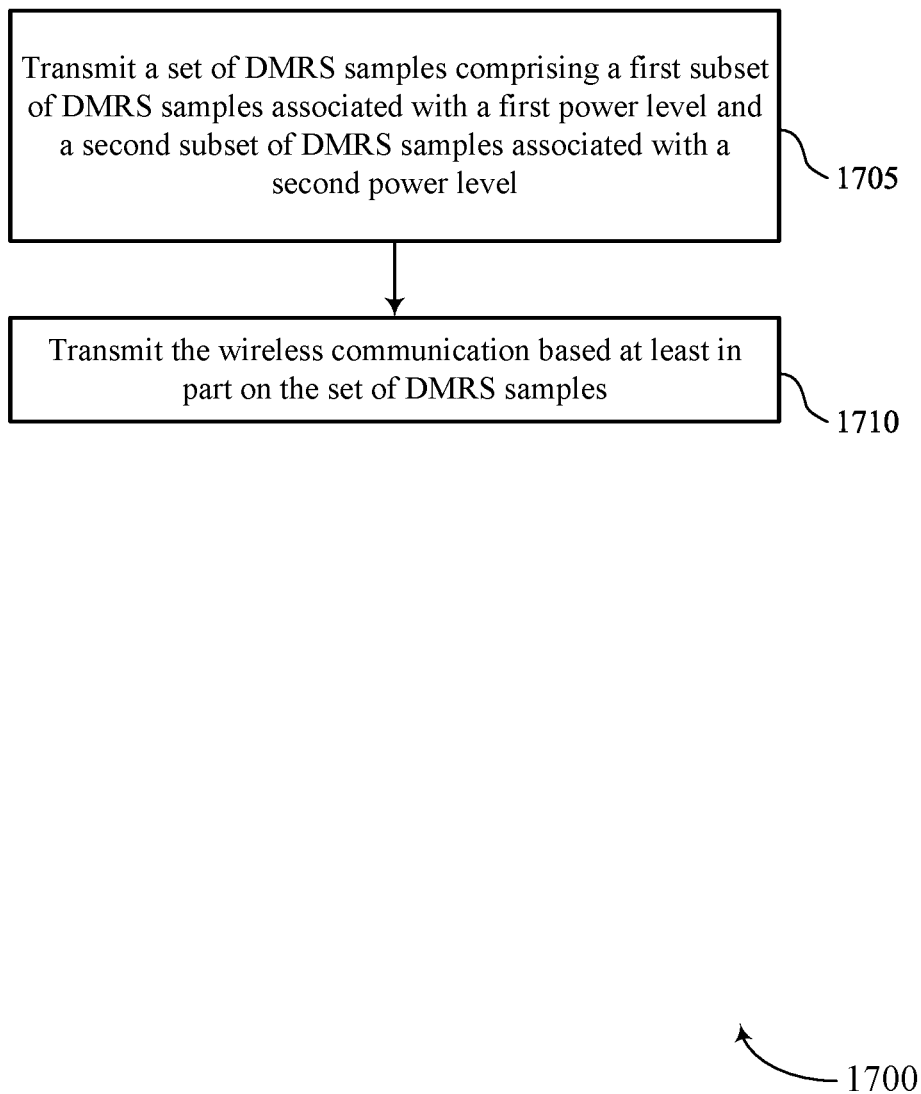

FIG. 17 shows a flowchart illustrating a method 1700 that supports channel and power amplifier nonlinearity estimation in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting a set of DMRS samples including a first subset of DMRS samples associated with a first power level and a second subset of DMRS samples associated with a second power level. The operations of 1705 may be performed in accordance with examples as disclosed herein. In some examples, aspects of the operations of 1705 may be performed by a signal component 1325 as described with reference to FIG. 13.

At 1710, the method may include transmitting the wireless communication based on the set of DMRS samples. The operations of 1710 may be performed in accordance with examples as disclosed herein. In some examples, aspects of the operations of 1710 may be performed by a downlink component 1330 as described with reference to FIG. 13.

The following provides an overview of aspects of the present disclosure:

Aspect 1: A method for wireless communication, comprising: receiving a set of DMRS samples comprising a first subset of DMRS samples associated with a first power level and a second subset of DMRS samples associated with a second power level; performing a digital post distortion operation based at least in part on the first subset of DMRS samples associated with the first power level and the second subset of DMRS samples associated with the second power level; and receiving the wireless communication based at least in part on performing the digital post distortion operation.

Aspect 2: The method of aspect 1, further comprising: receiving control signaling indicating a DMRS configuration, the DMRS configuration identifying different power levels for different DMRS samples, wherein receiving the set of DMRS samples comprising the first subset of DMRS samples associated with the first power level and the second subset of DMRS samples associated with the second power level is based at least in part on the DMRS configuration.

Aspect 3: The method of aspect 2, wherein receiving the control signaling comprises: receiving one or more of an RRC message, a DCI, or a MAC-CE, including the DMRS configuration identifying the different power levels for the different DMRS samples.

Aspect 4: The method of any of aspects 2 through 3, further comprising: receiving an indication in the control signaling a set of constellation points in a constellation distribution associated with a modulation scheme, wherein performing the digital post distortion operation is based at least in part on the set of constellation points of the constellation distribution associated with the modulation scheme.

Aspect 5: The method of aspect 4, wherein the modulation scheme comprises a QAM scheme.

Aspect 6: The method of any of aspects 4 through 5, wherein the modulation scheme comprises a QPSK scheme.

Aspect 7: The method of any of aspects 4 through 6, wherein the modulation scheme comprises an APSK modulation scheme.

Aspect 8: The method of any of aspects 1 through 7, further comprising: estimating a channel associated with the wireless communication and a nonlinearity of a power amplifier based at least in part on the first subset of DMRS samples associated with the first power level and the second subset of DMRS samples associated with the second power level, wherein performing the digital post distortion operation is based at least in part on estimating the channel associated with the wireless communication and the nonlinearity of the power amplifier.

Aspect 9: The method of any of aspects 1 through 8, further comprising: estimating a channel associated with the wireless communication based at least on the first subset of DMRS samples associated with the first power level, wherein performing the digital post distortion operation is based at least in part on estimating the channel associated with the wireless communication.

Aspect 10: The method of aspect 9, wherein estimating the channel comprises: estimating the channel using a subset of constellation points of a set of constellation points associated with a modulation scheme, the subset of constellation points corresponding to inner constellation points of a constellation distribution.

Aspect 11: The method of any of aspects 9 through 10, further comprising: estimating a nonlinearity of a power amplifier associated with the UE based at least in part on the second subset of DMRS samples associated with the second power level, wherein performing the digital post distortion operation is based at least in part on estimating the channel associated with the wireless communication and estimating the nonlinearity of the power amplifier associated with the UE.

Aspect 12: The method of aspect 11, wherein estimating the nonlinearity of the power amplifier comprises: estimating the nonlinearity of the power amplifier using a subset of constellation points of a set of constellation points associated with a modulation scheme, the subset of constellation points corresponding to outer constellation points of a constellation distribution.

Aspect 13: The method of any of aspects 1 through 12, wherein the wireless communication comprises a single carrier waveform transmission.

Aspect 14: A method for wireless communication at a base station, comprising: transmitting a set of DMRS samples comprising a first subset of DMRS samples associated with a first power level and a second subset of DMRS samples associated with a second power level; and transmitting the wireless communication based at least in part on the set of DMRS samples.

Aspect 15: The method of aspect 14, further comprising: transmitting control signaling indicating a DMRS configuration, the DMRS configuration identifying different power levels for different DMRS samples, wherein transmitting the set of DMRS samples comprising the first subset of DMRS samples associated with the first power level and the second subset of DMRS samples associated with the second power level is based at least in part on the DMRS configuration.

Aspect 16: The method of aspect 15, wherein transmitting the control signaling comprises: transmitting one or more of an RRC message, a DCI, or a MAC-CE, including the DMRS configuration identifying the different power levels for the different DMRS samples.

Aspect 17: The method of any of aspects 15 through 16, further comprising: determining a set of constellation points of a constellation distribution associated with a modulation scheme; and transmitting an indication in the control signaling of the set of constellation points of the constellation distribution associated with the modulation scheme.

Aspect 18: The method of aspect 17, wherein the modulation scheme comprises a QAM scheme.

Aspect 19: The method of any of aspects 17 through 18, wherein the modulation scheme comprises a QPSK scheme.

Aspect 20: The method of any of aspects 17 through 19, wherein the modulation scheme comprises an APSK modulation scheme.

Aspect 21: The method of any of aspects 14 through 20, wherein the wireless communication comprises a single carrier waveform transmission.

Aspect 22: An apparatus for wireless communication, comprising a processor; memory coupled with the processor; and instructions stored in the memory and executable by the processor to cause the apparatus to perform a method of any of aspects 1 through 13.

Aspect 23: An apparatus for wireless communication, comprising at least one means for performing a method of any of aspects 1 through 13.

Aspect 24: A non-transitory computer-readable medium storing code for wireless communication, the code comprising instructions executable by a processor to perform a method of any of aspects 1 through 13.

Aspect 25: An apparatus for wireless communication at a base station, comprising a processor; memory coupled with the processor; and instructions stored in the memory and executable by the processor to cause the apparatus to perform a method of any of aspects 14 through 21.

Aspect 26: An apparatus for wireless communication at a base station, comprising at least one means for performing a method of any of aspects 14 through 21.

Aspect 27: A non-transitory computer-readable medium storing code for wireless communication at a base station, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a demodulation reference signal comprising a set of demodulation reference signal samples comprising a first subset of demodulation reference signal samples associated with a first power level and a second subset of demodulation reference signal samples associated with a second power level;
   performing a digital post distortion operation based at least in part on the received demodulation reference signal comprising the first subset of demodulation reference signal samples associated with the first power level and the second subset of demodulation reference signal samples associated with the second power level; and
   receiving the wireless communication based at least in part on performing the digital post distortion operation.

2. The method of claim 1, further comprising:
   receiving control signaling indicating a demodulation reference signal configuration, the demodulation reference signal configuration identifying different power levels for different demodulation reference signal samples,
   wherein receiving the set of demodulation reference signal samples comprising the first subset of demodulation reference signal samples associated with the first power level and the second subset of demodulation reference signal samples associated with the second power level is based at least in part on the demodulation reference signal configuration.

3. The method of claim 2, wherein receiving the control signaling comprises:
   receiving one or more of a radio resource control message, a downlink control information, or a medium access control-control element, including the demodulation reference signal configuration identifying the different power levels for the different demodulation reference signal samples.

4. The method of claim 2, further comprising:
   receiving an indication in the control signaling a set of constellation points in a constellation distribution associated with a modulation scheme,
   wherein performing the digital post distortion operation is based at least in part on the set of constellation points of the constellation distribution associated with the modulation scheme.

5. The method of claim 4, wherein the modulation scheme comprises a quadrature amplitude modulation (QAM) scheme.

6. The method of claim 4, wherein the modulation scheme comprises an amplitude and phase-shift keying (APSK) modulation scheme.

7. The method of claim 1, further comprising:
estimating a channel associated with the wireless communication and a nonlinearity of a power amplifier based at least in part on the first subset of demodulation reference signal samples associated with the first power level and the second subset of demodulation reference signal samples associated with the second power level,
wherein performing the digital post distortion operation is based at least in part on estimating the channel associated with the wireless communication and the nonlinearity of the power amplifier.

8. The method of claim 1, further comprising:
estimating a channel associated with the wireless communication based at least on the first subset of demodulation reference signal samples associated with the first power level,
wherein performing the digital post distortion operation is based at least in part on estimating the channel associated with the wireless communication.

9. The method of claim 8, wherein estimating the channel comprises:
estimating the channel using a subset of constellation points of a set of constellation points associated with a modulation scheme, the subset of constellation points corresponding to inner constellation points of a constellation distribution.

10. The method of claim 8, further comprising:
estimating a nonlinearity of a power amplifier associated with the UE based at least in part on the second subset of demodulation reference signal samples associated with the second power level,
wherein performing the digital post distortion operation is based at least in part on estimating the channel associated with the wireless communication and estimating the nonlinearity of the power amplifier associated with the UE.

11. The method of claim 10, wherein estimating the nonlinearity of the power amplifier comprises:
estimating the nonlinearity of the power amplifier using a subset of constellation points of a set of constellation points associated with a modulation scheme, the subset of constellation points corresponding to outer constellation points of a constellation distribution.

12. The method of claim 1, wherein the wireless communication comprises a single carrier waveform transmission.

13. A method for wireless communication at a base station, comprising:
transmitting a demodulation reference signal comprising a set of demodulation reference signal samples comprising a first subset of demodulation reference signal samples associated with a first power level and a second subset of demodulation reference signal samples associated with a second power level; and
transmitting the wireless communication based at least in part on the transmitted demodulation reference signal comprising the set of demodulation reference signal samples.

14. The method of claim 13, further comprising:
transmitting control signaling indicating a demodulation reference signal configuration, the demodulation reference signal configuration identifying different power levels for different demodulation reference signal samples,
wherein transmitting the set of demodulation reference signal samples comprising the first subset of demodulation reference signal samples associated with the first power level and the second subset of demodulation reference signal samples associated with the second power level is based at least in part on the demodulation reference signal configuration.

15. The method of claim 14, wherein transmitting the control signaling comprises:
transmitting one or more of a radio resource control message, a downlink control information, or a medium access control-control element, including the demodulation reference signal configuration identifying the different power levels for the different demodulation reference signal samples.

16. The method of claim 14, further comprising:
determining a set of constellation points of a constellation distribution associated with a modulation scheme; and
transmitting an indication in the control signaling of the set of constellation points of the constellation distribution associated with the modulation scheme.

17. The method of claim 16, wherein the modulation scheme comprises a quadrature amplitude modulation (QAM) scheme.

18. The method of claim 16, wherein the modulation scheme comprises an amplitude and phase-shift keying (APSK) modulation scheme.

19. The method of claim 13, wherein the wireless communication comprises a single carrier waveform transmission.

20. An apparatus for wireless communication, comprising:
a processor;
memory coupled with the processor; and
instructions stored in the memory and executable by the processor to cause the apparatus to:
receive a demodulation reference signal comprising a set of demodulation reference signal samples comprising a first subset of demodulation reference signal samples associated with a first power level and a second subset of demodulation reference signal samples associated with a second power level;
perform a digital post distortion operation based at least in part on the received demodulation reference signal comprising the first subset of demodulation reference signal samples associated with the first power level and the second subset of demodulation reference signal samples associated with the second power level; and
receive the wireless communication based at least in part on performing the digital post distortion operation.

21. The apparatus of claim 20, wherein the instructions are further executable by the processor to cause the apparatus to:
receive control signaling indicating a demodulation reference signal configuration, the demodulation reference signal configuration identifying different power levels for different demodulation reference signal samples,
wherein the instructions to receive the set of demodulation reference signal samples comprising the first subset of demodulation reference signal samples associated with the first power level and the second subset of demodulation reference signal samples associated with the second power level are further executable by the processor based at least in part on the demodulation reference signal configuration.

22. The apparatus of claim 21, wherein the instructions to receive the control signaling are executable by the processor to cause the apparatus to:

receive one or more of a radio resource control message, a downlink control information, or a medium access control-control element, including the demodulation reference signal configuration identifying the different power levels for the different demodulation reference signal samples.

23. The apparatus of claim 21, wherein the instructions are further executable by the processor to cause the apparatus to:

receive an indication in the control signaling a set of constellation points in a constellation distribution associated with a modulation scheme, wherein the instructions to perform the digital post distortion operation are further executable by the processor based at least in part on the set of constellation points of the constellation distribution associated with the modulation scheme.

24. The apparatus of claim 23, wherein the modulation scheme comprises a quadrature amplitude modulation (QAM) scheme.

25. The apparatus of claim 23, wherein the modulation scheme comprises an amplitude and phase-shift keying (APSK) modulation scheme.

26. An apparatus for wireless communication at a base station, comprising:

a processor;

memory coupled with the processor; and instructions stored in the memory and executable by the processor to cause the apparatus to:

transmit a demodulation reference signal comprising a set of demodulation reference signal samples comprising a first subset of demodulation reference signal samples associated with a first power level and a second subset of demodulation reference signal samples associated with a second power level; and transmit the wireless communication based at least in part on the transmitted demodulation reference signal comprising the set of demodulation reference signal samples.

27. The apparatus of claim 26, wherein the instructions are further executable by the processor to cause the apparatus to:

transmit control signaling indicating a demodulation reference signal configuration, the demodulation reference signal configuration identifying different power levels for different demodulation reference signal samples, wherein the instruction to transmit the set of demodulation reference signal samples comprising the first subset of demodulation reference signal samples associated with the first power level and the second subset of demodulation reference signal samples associated with the second power level are further executable by the processor based at least in part on the demodulation reference signal configuration.

28. The apparatus of claim 27, wherein the instructions to transmit the control signaling are executable by the processor to cause the apparatus to:

transmit one or more of a radio resource control message, a downlink control information, or a medium access control-control element, including the demodulation reference signal configuration identifying the different power levels for the different demodulation reference signal samples.

29. The apparatus of claim 27, wherein the instructions are further executable by the processor to cause the apparatus to:

determine a set of constellation points of a constellation distribution associated with a modulation scheme; and transmit an indication in the control signaling of the set of constellation points of the constellation distribution associated with the modulation scheme.

30. The apparatus of claim 29, wherein the modulation scheme comprises a quadrature amplitude modulation (QAM) scheme.

* * * * *